(12) United States Patent
Bishop

(10) Patent No.: US 11,506,026 B2
(45) Date of Patent: Nov. 22, 2022

(54) POWER SYSTEM AND METHOD

(71) Applicant: MGB OILFIELD SOLUTIONS, L.L.C., Houston, TX (US)

(72) Inventor: Mark Daniel Bishop, Katy, TX (US)

(73) Assignee: MGB OILFIELD SOLUTIONS, L.L.C., Katy, TX (US)

( * ) Notice: Subject to any disclaimer, the term of this patent is extended or adjusted under 35 U.S.C. 154(b) by 45 days.

(21) Appl. No.: 16/892,236

(22) Filed: Jun. 3, 2020

(65) Prior Publication Data

US 2020/0291753 A1 Sep. 17, 2020

Related U.S. Application Data

(63) Continuation of application No. 15/955,521, filed on Apr. 17, 2018, now Pat. No. 10,711,576.

(60) Provisional application No. 62/617,164, filed on Jan. 12, 2018, provisional application No. 62/505,066, filed on May 11, 2017, provisional application No.
(Continued)

(51) Int. Cl.
| | |
|---|---|
| *E21B 7/02* | (2006.01) |
| *E21B 41/00* | (2006.01) |
| *E21B 43/26* | (2006.01) |
| *H02J 3/38* | (2006.01) |
| *F04B 47/02* | (2006.01) |
| *H02J 3/14* | (2006.01) |
| *E21B 43/16* | (2006.01) |

(52) U.S. Cl.
CPC .......... *E21B 41/0085* (2013.01); *E21B 7/022* (2013.01); *E21B 43/26* (2013.01); *F04B 47/02* (2013.01); *H02J 3/381* (2013.01); *E21B 43/162* (2013.01); *H02J 3/14* (2013.01)

(58) Field of Classification Search
CPC ........ E21B 7/022; E21B 43/26; E21B 43/129; F04B 47/02
See application file for complete search history.

(56) References Cited

U.S. PATENT DOCUMENTS

| | | |
|---|---|---|
| 5,997,737 A | 12/1999 | Sturdevantt et al. |
| 6,140,798 A | 10/2000 | Krieger |
| (Continued) | | |

FOREIGN PATENT DOCUMENTS

WO   WO 02/36948 A1   5/2002

OTHER PUBLICATIONS

International Searching Authority, International Search Report and Written Opinion of the ISA, International Application No. PCT/US18/28035; dated Jun. 21, 2018.
(Continued)

*Primary Examiner* — Catherine Loikith
(74) *Attorney, Agent, or Firm* — The Compton Law Firm, P.C.; Scott D. Compton

(57) ABSTRACT

The application is directed to a power system that may be provided in a portable form and operationally configured for use at a work site as a single source of electric power, hydraulic power and pneumatic power for work site operations. In regard to hydraulic fracturing stimulation of a wellbore, the power system is operationally configured as the source of hydraulic power for transportable pumping units of a fracturing operation and for hydraulic power tools, as the source of pneumatic power for pneumatic power tools and as the source of electric power for electric power tools and electronic equipment at a well site.

19 Claims, 25 Drawing Sheets

Related U.S. Application Data

62/489,468, filed on Apr. 25, 2017, provisional application No. 62/486,858, filed on Apr. 18, 2017.

(56) References Cited

U.S. PATENT DOCUMENTS

| | | | |
|---|---|---|---|
| 8,276,658 B2* | 10/2012 | Cox | E21B 17/203 |
| | | | 166/73 |
| 9,395,049 B2 | 7/2016 | Vicknair et al. | |
| 9,534,473 B2 | 1/2017 | Morris et al. | |
| 10,119,380 B2 | 11/2018 | Joseph | |
| 10,768,642 B2* | 9/2020 | Bishop | G05D 16/206 |
| 2009/0194273 A1* | 8/2009 | Surjaatmadja | E21B 43/26 |
| | | | 166/250.1 |
| 2009/0206612 A1 | 8/2009 | Baldassare | |
| 2012/0219391 A1* | 8/2012 | Teichrob | B65G 67/40 |
| | | | 414/293 |
| 2013/0233542 A1 | 9/2013 | Shampine et al. | |
| 2013/0242688 A1 | 9/2013 | Kageler | |
| 2014/0067146 A1 | 3/2014 | Martinez | |
| 2014/0096974 A1 | 4/2014 | Coli et al. | |
| 2014/0277772 A1* | 9/2014 | Lopez | E21B 43/26 |
| | | | 700/282 |
| 2015/0035459 A1 | 2/2015 | Yang et al. | |
| 2015/0252661 A1 | 9/2015 | Glass | |
| 2015/0354322 A1 | 12/2015 | Vicknair et al. | |
| 2016/0090189 A1 | 3/2016 | Wangemann et al. | |
| 2016/0111876 A1 | 4/2016 | Cruz | |
| 2016/0258267 A1* | 9/2016 | Payne | E21B 43/2607 |
| 2017/0130555 A1* | 5/2017 | Kajaria | E21B 43/26 |

OTHER PUBLICATIONS

Bishop, Claims 1-13 of International Application No. PCT/US18/28035; Apr. 17, 2018.

* cited by examiner

POWER SYSTEM AND METHOD

CROSS-REFERENCE TO RELATED APPLICATIONS

This application is a continuation of U.S. patent application Ser. No. 15/955,521, filed on Apr. 17, 2018, which claims benefit of U.S. Provisional Patent Application No. 62/486,858, filed on Apr. 18, 2017 U.S. Provisional Patent Application No. 62/489,468, filed on Apr. 25, 2017, U.S. Provisional Patent Application No. 62/505,066, filed on May 11, 2017, and U.S. Provisional Patent Application No. 62/617,164, filed on Jan. 12, 2018, the content of each of which is hereby incorporated by reference in its entirety.

STATEMENT REGARDING FEDERALLY SPONSORED RESEARCH OR DEVELOPMENT

Not applicable.

BACKGROUND

The application relates generally to a system providing hydraulic power and/or pneumatic power and/or electric power as a permanent installation at a work site or as a portable system for temporary operation at a work site.

Hydraulic fracturing, sometimes called "fracing" or "fracking" is a process for increasing the flow of oil or gas from a well. Fracking typically involves pumping specific types of liquids into a well, under pressures that are high enough to fracture the rock forming interconnected fractures that serve as pore spaces for the movement of oil and natural gas to a wellbore. Known hydraulic fracturing equipment used in oil and natural gas fields typically includes a large number of equipment and components, for example, blenders, high-volume fracturing pumps, monitoring units, material tanks, hoses, pipes, electronics systems, lighting, power units and backup power units required for known day and/or night fracturing operations.

Known fracturing operations require considerable operational infrastructure, including large investments in fracturing equipment and related personnel. Notably, standard transportable pumping units require large volumes of diesel fuel and extensive equipment maintenance programs. Typically, each transportable pumping unit on site requires either a tractor with a power take off ("PTO") or an alternative engine to start the pumping unit engine. At the time of this application, in the United States of America each tractor requires at least one U.S. Department of Transportation ("DOT") driver. Drivers must operate on the highways, hauling equipment on and off work sites. A potentially large fleet of tractor trailers, e.g., semi-trailer trucks, necessary for fracturing operations can cause work site congestion and may impact the local community in terms of traffic congestion and road-surface wear and tear. A large fleet of tractor trailers also often times results in too many people being on location at a well site, While some drivers may have other on-site responsibilities, other personnel have little to do but sit in the cabin of the tractor during fracturing operations. A well site can be a dangerous place and having twenty (20) to fifty (50) non-essential personnel on location often poses safety issues and increases operating expenses.

With average fracturing operations requiring as many as fifty transportable pumping units operating concurrently, the work site area, or "footprint", required to accommodate such fracturing operations is large and the operational infrastructure required to support these fracturing operations is extensive. Greater efficiency in fracturing operations is desired.

SUMMARY

The present application is directed to a power system including a platform supporting a primary power source, a hydraulic power supply system, an electric power supply system and a pneumatic power supply system thereon, wherein the primary power source is the exclusive source of power for the hydraulic power supply system, electric power supply system and the pneumatic power supply system.

The present application is also directed to a system for stimulating the production of hydrocarbons from subterranean formations at a well site including (1) one or more high pressure fracturing pumps operationally configured to inject fluid into one or more wells at the well site; and (2) a portable power system including a platform supporting a primary power source, a hydraulic power supply system, an electric power supply system and a pneumatic power supply system thereon; wherein the primary power source is the exclusive source of power for the hydraulic power supply system, electric power supply system and the pneumatic power supply system; and wherein the hydraulic power supply system is the exclusive power source for the one or more high pressure fracturing pumps.

The present application is also directed to a modular power system including a first modular platform supporting a first modular primary power source, a hydraulic power supply system including a first modular hydraulic power unit, an electric power supply system including one or more modular transformers and a pneumatic power supply system thereon, wherein the primary power source is the exclusive source of power for the hydraulic power supply system, electric power supply system and the pneumatic power supply system.

DETAILED DESCRIPTION

Figure 1:
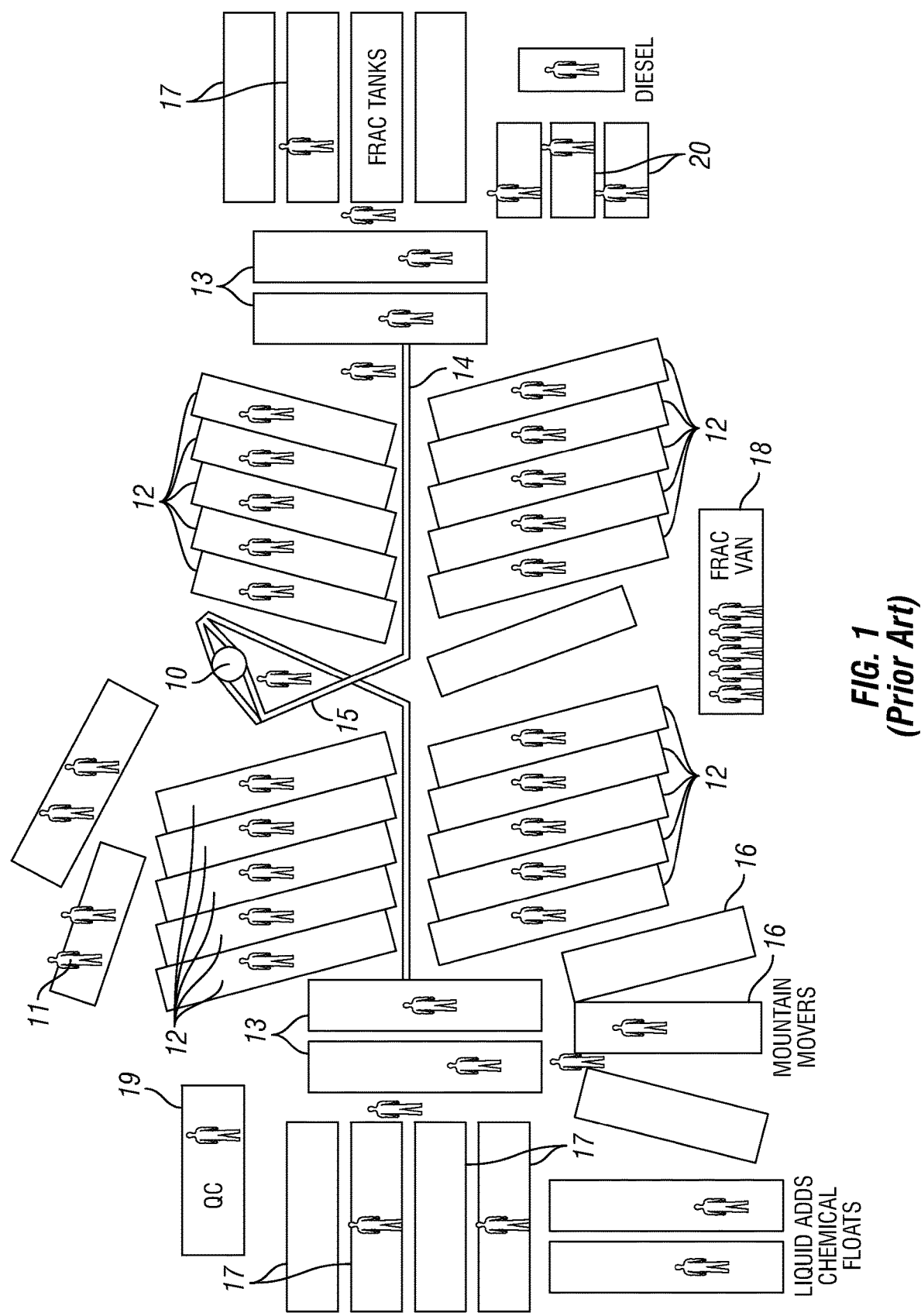
FIG. 1 is a prior art schematic plan view of a known fracturing spread as of the time of the filing of this application.

The Figures described above and the written description of specific structures and functions below are not provided to limit the scope of the invention. Rather, the Figures and written description are provided to teach persons skilled in the art to make and use the invention for which patent protection is sought. The skilled artisan will appreciate that not necessarily every feature of a commercial embodiment of the invention is described or shown. Also, it is to be understood that the present invention is not limited to particular embodiments. It is also to be understood that the terminology used herein is for the purpose of describing particular embodiments only, and is not intended to be limiting.

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value. The terms "first," "second," and the like, herein do not denote any order, quantity, or importance, but rather are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be", or "can" or "can be". Furthermore, the use of relational terms, such as, but not limited to, "top," "bottom," "left," "right," "upper," "lower," "down," "up," "side," and the like are used in the written description for clarity in specific reference to the Figures and are not intended to limit the scope of the invention. As used herein, any references to "one embodiment" or "an embodiment" or "another embodiment" means that a particular element, feature, structure, or characteristic described in connection with the embodiment is included in at least one embodiment. The appearances of the phrase "in one embodiment" in various places in the specification are not necessarily referring to the same embodiment.

As used in this specification and the appended claims, the phrases "data acquisition and control center," "data van," "frac van" and like phrases refer to a computerized central command center to control all or at least some critical well site equipment while monitoring, recording and supervising the fracturing treatment. As understood by the skilled artisan, a "data van" is typically located at the site of hydraulic fracturing and may include one or more video monitors and/or living quarters. The combination of various equipment used for hydraulic fracturing of a well is typically referred to in the industry as a "spread," "fracturing spread" or "frac spread" and such may be used herein interchangeably. General details regarding hydraulic fracturing and the equipment used can be found in a large number of references including, for example, U.S. Pat. No. 3,888,311, entitled "Hydraulic Fracturing Method," incorporated herein by reference in its entirety. Herein, the term "stimulation" generally refers to the treatment of geological formations to improve the recovery of liquid and/or gas hydrocarbons. As understood by the skilled artisan, "SMART technology" refers to Self-Monitoring Analysis and Reporting Technology used to prevent computer hard drive errors.

The phrase "transportable pumping unit" may be used interchangeably with the phrases "fracturing pump" and "frac pump," which herein suitably includes a trailer, absent a tractor, housing an engine, transmission, high pressure pump (typically a Triplex pump or Quintuplex pump), hydraulic system, power end lubrication, packing lubrication and all necessary valves and controls for operation of the frac pump as understood by the skilled artisan. As understood by the skilled artisan, fracturing pumps pressurize fracturing fluid, e.g., water, propane, or other suitable media, typically combined with proppant) prior to injection of the pressurized fluid into a wellbore to fracture the underlying formation. Herein, a plurality of frac pumps in use at a well site may be referred to collectiviely as a "frac pump sub-system." Examples of commercially available frac pumps for use as part of this application include, but are not necessarily limited to the FT-2251 Trailer Mounted Fracturing United available from Stewart & Stevenson, L.L.C., Houston, Tex., U.S.A.; Triplex and Quintuplex frac pumps available from Freemyer Industrial Pressure L.P., Fort Worth, Tex., U.S.A.; the Q10 Pumping Unit available from Halliburton Energy Services, Inc., Houston, Tex., U.S.A., and the 2700 high-pressure frac pump unit available from Baker Hughes Incorporated, Houston, Tex., U.S.A. As understood by the skilled artisan, the acronym "ISO" refers to the International Organization for Standardization, Geneva, Switzerland. Herein, a "power system" may also be referred to as a "power assembly," "power pack assembly," "power pack," "power unit assembly," "power source assembly" or "power supply assembly." The terms "mobile," "portable" and "transportable" may both be used to describe an item, object, system or assembly discussed herein as being readily movable from one physical location to another. As understood by the skilled artisan "DNV" certification standards refer to those certification standards provided by DNV GL, an international accredited registrar and classification society headquartered near Oslo, Norway. Herein, the phrase "revolutions per minute" may be shortened to "rpm." Herein, the term "horsepower" may be shortened to "hp." Herein, the term "Hertz" may be shortened to "Hz." Herein, the term "megapascal" may be shortened to "MPa." Herein, the phrase "pounds per square inch" may be shortened to "psi." Herein, the phrase "liters per second" may be shortened to "L/s." Herein, the phrase "cubic feet per minute" may be shortened to "cfm." Herein, the phrase "cubic meters per minute" may be shortened to "cmm." Herein, the phrase "barrels per minute" may be shortened to "bpm." Herein, "ASTM" refers to standards developed or defined by ASTM International, West Conshohocken, Pa., U.S.A.

In one aspect, the application provides a fixable or mobile power system including, a hydraulic fluid delivery system for powering a frac pump sub-system, the mobile power system being effective to reduce the number of vehicles, equipment and/or personnel needed at the well site during operations, and/or reduce costs, improve efficiency of overall operations, save time and delay caused by equipment failure and maintenance, reduce the number of drivers and operators needed, improve safety, reduce vehicle emissions, and combinations thereof. The power system may also include a pneumatic power supply and at least one electrical generator and at least one PTO for powering items such as hydraulic power tools. The power system of this application lowers capital expenditures ("CAPEX") and operating expenditures ("OPEX").

In another aspect, the application provides a fixable or portable power system effective as the source of hydraulic, pneumatic and electric power of a frac spread during fracturing operations. The power system is operationally configured to power all lighting and the control building or data van for an entire well site. The power system is also operationally configured to provide backup power for auxiliary electrical needs.

In another aspect, the application provides a portable hydraulic power system including a primary power source in the form of an engine including a first PTO for delivery of hydraulic fluid to one or more frac pumps and a second PTO for powering hydraulic power tools.

In another aspect, the application provides a system for minimizing the footprint of a frac spread used during a hydraulic fracturing operation. The application also provides a method of minimizing the footprint of a frac spread by replacing known frac spread equipment with the power system of this application.

In another aspect, the application provides a power system having a single source of compressed air, electric power and pressurized hydraulic fluid for powering frac pumps, the power source being portable to and from various locations including, but not limited to oilfield well sites. The power system may employ SMART technology and telemetry effective to enhance maintainability and operability of the power system, and in addition to field-viewing capabilities, provide full remote-viewing capabilities, e.g., remote diagnostics, location tracking and performance monitoring via one or more remote control centers.

In another aspect, the application provides a power system having an internal combustion engine as a power source for hydraulic power, pneumatic power and electric power at a work site including, but not necessarily limited to a well site.

In another aspect, the application provides a novel design for a portable power system, including an electric power supply system operationally configured to generate electricity to power electrical power items and equipment such as lights, power tools, air compressors, and a data van at a field site. The power system also includes a hydraulic power supply system for driving hydraulic power tools and frac pumps and a pneumatic power supply system for driving pneumatic power tools and operating as an air supply.

In another aspect, the application provides a process for powering frac spread equipment via a portable power system operationally configured to provide pneumatic power, hydraulic power and electric power. The process includes providing a power source having a primary power source, a hydraulic power supply system, an electric power supply system and a pneumatic power supply system. The hydraulic power supply system is operationally configured to provide remote start capabilities to multiple hydraulic fracturing pumps simultaneously, thus eliminating the need for tractors in the field, as well as multiple equipment operators to start the hydraulic fracturing pumps. The electric power supply system provides all of the electrical requirements at a well site, eliminating the need to manage multiple assets at the well site. The pneumatic power supply system provides pneumatic power to handle most well site requirements from pneumatic tools used by mechanics, specialize pneumatic tools used on wellheads and wireline applications and provides general air at a well site, eliminating the need for a mechanics truck and/or a rental compressor.

In another aspect, the application provides a method of powering one or more frac pumps at a well site using a single power system as described herein.

In another aspect, the application provides a method of circulating hydraulic fluid amongst a plurality of frac pumps in a manner effective to start each frac pump at a desired time relative to the start time of one or more other frac pumps in use for a hydraulic fracturing operation. The circulation of hydraulic fluid may be closed loop and include hydraulic fluid filters.

In another aspect, the application provides a fracturing system, comprising a power system operationally configured to (1) deliver hydraulic power to a frac pump sub-system via a closed loop feed, the frac pumps being operationally configured to deliver pressurized fracturing fluid into at least one wellbore, under high pressure conditions sufficient to increase the downhole pressure of the wellbore, to exceed that of the fracture gradient of the solid matter surrounding the wellbore; (2) provide electricity to frac spread equipment and other items requiring electric power for operation via at least one electric generator; and (3) provide pneumatic power to frac spread equipment and other items requiring pneumatic power.

In another aspect, the application provides a hydraulic fracturing system for stimulating oil or gas production from a wellbore during a fracturing operation, including (1) one or more frac pumps for delivering fracturing fluid into the wellbore; and (2) a power system in fluid communication with each of the frac pumps in a closed loop feed, the power system being operationally configured to provide hydraulic power to each of the frac pumps for purposes of starting each of the frac pumps for operation. The power system is further operationally configured to provide hydraulic power to hydraulic power tools, electricity to fracturing operation equipment requiring electric power for operation and pneumatic power to equipment requiring the same. The hydraulic fracturing system may also include a system control unit operationally configured to control parameters of the one or more frac pumps and the power system.

In another aspect, the application provides a method of hydraulic fracturing stimulation of a wellbore comprising: (1) providing a frac pump sub-system and a power system in fluid communication with the frac pump sub-system; (2) powering the power system; (3) delivering hydraulic fluid from the power system to the frac pump sub-system to start the frac pump sub-system; (4) once the frac pump sub-system is powered on, pumping fracturing fluid into a wellbore at a primary flow rate; and (5) monitoring the hydraulic fracturing using various controls on-site and/or remotely.

In another aspect, the application provides a hydraulic fracturing system effective to simplify the power-delivery mechanism for powering transportable pumping units and/or reduce the number of vehicles at a well site and/or reduce the amount of personnel and the amount of equipment at a well site during fracturing operations.

In another aspect, the application provides a mobile power system with a hydraulic fracturing fluid delivery system for controlling the pumping of high pressure fracturing fluid into an underground wellbore at a well site, the mobile power system being transportable between multiple well sites. In one suitable embodiment, the mobile power system comprises a primary power source, one or more pump assemblies in fluid communication with one or more transportable pumping units and one or more electrical power sources for providing electrical power to fracking equipment all on a single mobile platform such as a support skid or modular support skid.

In another aspect, the application provides a mobile power system operationally configured to provide power for one or more fracturing pumps, one or more light sources, one or more control centers including one or more data acquisition control centers, one or more hydraulic power tools, one or more pneumatic power tools, and combinations thereof.

In another aspect, the application provides a process for extracting hydrocarbons from a reservoir rock formation by a hydraulic fracturing operation, comprising the step of introducing a hydraulic fracturing treatment fluid into a subterranean formation at a pressure sufficient to form or to enhance at least one fracture within the subterranean formation. The fracturing treatment fluid is pumped into at least one wellbore in the subterranean formation by a plurality of frac pumps that are powered by a common power system, i.e., a common power source.

In another aspect, the application provides a frac spread having a mobile power system as the sole source of hydraulic power for the frac spread and as a source of electric power and/or pneumatic power for the frac spread. In another embodiment, the mobile power system may be the sole source of electric power and/or pneumatic power for the frac spread.

In another aspect, the application provides a hydraulic fracturing system including a frac spread having a mobile power system as the sole source of hydraulic power for the frac spread and as a source of electric power and/or pneumatic power for the frac spread. In another embodiment, the mobile power system may be the sole source of electric power and/or pneumatic power for the frac spread.

In another aspect, the application provides a scalable power system operationally configured for (1) less demanding operations such as general fluid pumping operations and pump down operations, (2) fluid operations of high demand such as fracturing operations and emergency dewatering operations, and (3) fluid operations employing difficult or challenging fluids of high viscosity.

In another aspect, the application provides a portable power system including a hydraulic power source, an electric power source, a pneumatic power source driven by a common primary power source of the system.

In another aspect, the application provides a power system including an internal combustion engine operationally configured as a power source for hydraulic power, pneumatic power and electric power at a work site.

In another aspect, the application provides a power system including an enclosure housing a primary power source, a hydraulic power source, an electric power source and a pneumatic power source therein. The hydraulic power source, electric power source and pneumatic power source are each driven or powered exclusively by the primary power source. The enclosure is operationally configured to provide access to outlets in communication with each of the hydraulic power source, electric power source and pneumatic power source.

In another aspect, the application provides a portable or mobile power system including a hydraulic power supply system, an electric power supply system and a pneumatic power supply system on a single platform driven by a common internal combustion engine located on the platform of the power system.

In another aspect, the application provides a system for stimulating a formation, the system including (1) a source of fracturing fluid in communication with the formation; (2) a portable power system including a platform supporting a primary power source, a hydraulic power supply system, an electric power supply system and a pneumatic power supply system thereon, wherein the primary power source is the exclusive source of power for the hydraulic power supply system, electric power supply system and the pneumatic power supply system; and one or more high pressure fracturing pumps in fluid communication with the source of fracturing fluid; (3) wherein the hydraulic power supply system is the exclusive power source for the one or more high pressure fracturing pumps; and (4) wherein one or more high pressure fracturing pumps pressurize fracturing fluid for flowing said fracturing fluid into the formation.

In another aspect, the application provides a modular power system for assembly as desired including a first modular platform supporting a first modular primary power source, a hydraulic power supply system including a first modular hydraulic power unit, an electric power supply system including one or more modular transformers and a pneumatic power supply system thereon, wherein the primary power source is the exclusive source of power for the hydraulic power supply system, electric power supply system and the pneumatic power supply system. The modular power system may include one or more additional modular platforms for supporting different operable components of the power system. In addition, one or more operable components may be supported on fixed platforms at one or more particular locations.

As a point of reference, a typical frac spread employed at the time of this application may include various types of equipment, for example: (1) one or more slurry blenders to mix the fracking fluids; (2) any number of transportable pumping units typically located on transportable platforms such as trailers pulled by tractors, the pumping units including high-pressure, high-volume pumps such as triplex or quintuplex pumps for pumping facturing fluid into a well; (3) monitoring equipment; (4) fracturing fluid tanks; (5) proppant storage tanks; (6) one or more chemical additive units; (7) high-pressure treating iron; (8) low-pressure flexible hoses; and (9) various meters and gauges. A typical frac spread as known to the skilled artisan is depicted in the simplified diagram of FIG. 1. As shown, a well site of about 14,164.0 square meters (about 3.5 acres) can be quite congested in terms of equipment and manpower. It is not unusual for about fifty (50) or more persons (see symbol 11) to be present at a well site. When factoring in support crews, there may be about seventy (70) or more persons 11 present at a typical well site during fracturing operations.

Looking at FIG. 1 in more detail, the formation of each fracture (or each "stage") of a typical well 10 may require the injection of hundreds of thousands of gallons of fluid under high pressure supplied by one or more frac pumps 12, which are normally mounted on trucks or tractors as such are often referred to in the industry. Typically, the tractors delivering the frac pumps n remain at the well site throughout treatment of a well 10. Typically, tractors are backed into position side by side providing a series of frac pumps 12 in a row. Very often, frac pumps 12 are aligned in series in two opposing rows aligned in opposing rows, often referred to as a "right hand pump bank" and a "left hand pump bank." Suitably, the right hand and left hand pump banks are aligned on opposing sides of a centralized manifold 14 as shown in FIG. 1. As understood by persons of ordinary skill in the art of fracking, the manifold 14 is designed to convey fluid from each of the frac pumps 12 to a flow line 15 that is fluidly connected to the well 10. In known operations, fluid and additives are blended in one or more blenders 13 and taken by the manifold 14 to the intake or suction of the frac pumps 12. Proppant storage vessels 16 and liquid storage vessels 17 may be used for maintaining a supply of materials during fracturing operations. Monitoring, recording and supervising the fracturing operation may be performed in a control center such as a data van 18. Quality control tests of the fluid and additives may be performed in a separate location or structure 19 before and during well treatments. Fuel for prime movers of the pumps may be stored in tanks 20.

It is common in hydraulic fracturing operations to fracture a well with ten to twenty stages of fracturing treatment. The total amount of fluid pumped under high pressure may be as high as five million gallons or more. Depending on the particular fracturing operation at a well site, fracturing equipment can be operated across a range of different pressures and injection rates that are specific to a particular well 10. On the high end of the spectrum, the pressure used for hydraulic fracturing may be as high as 103421250 pascal (15,000 psi) and the injection rate could be as much as 15501.7 liters (130.0 barrels) per minute.

Accordingly, the present application is drawn to a power system, system and method effective to minimize the overall footprint at a well site by minimizing manpower, reducing fuel costs and minimizing the amount of equipment employed at a well site during fracturing operations, which also serves to reduce travel costs for transporting equipment to and from a well site. In one aspect, the invention provides a closed loop hydraulic system for powering frac pumps at a well site. In another aspect, the invention provides a system effective to activate each frac pump via a common power system serving as a common hydraulic fluid source for the frac pumps of the system. In another aspect, the invention provides a single portable power supply for providing (1) hydraulic power to (a) frac pumps and (b) hydraulic power tools and (2) electric power to equipment and other items requiring electric power for operation. In other words, the frac pumps of the present system utilize a common source of hydraulic power to start the frac pumps as opposed to using individual tractors to start each of the frac pumps as currently known in the art of fracturing operations. As understood by the skilled artisan, the configuration of the power system described herein may be altered to meet one or more particular hydraulic and/or electrical power requirements and/or specifications.

Figure 2:
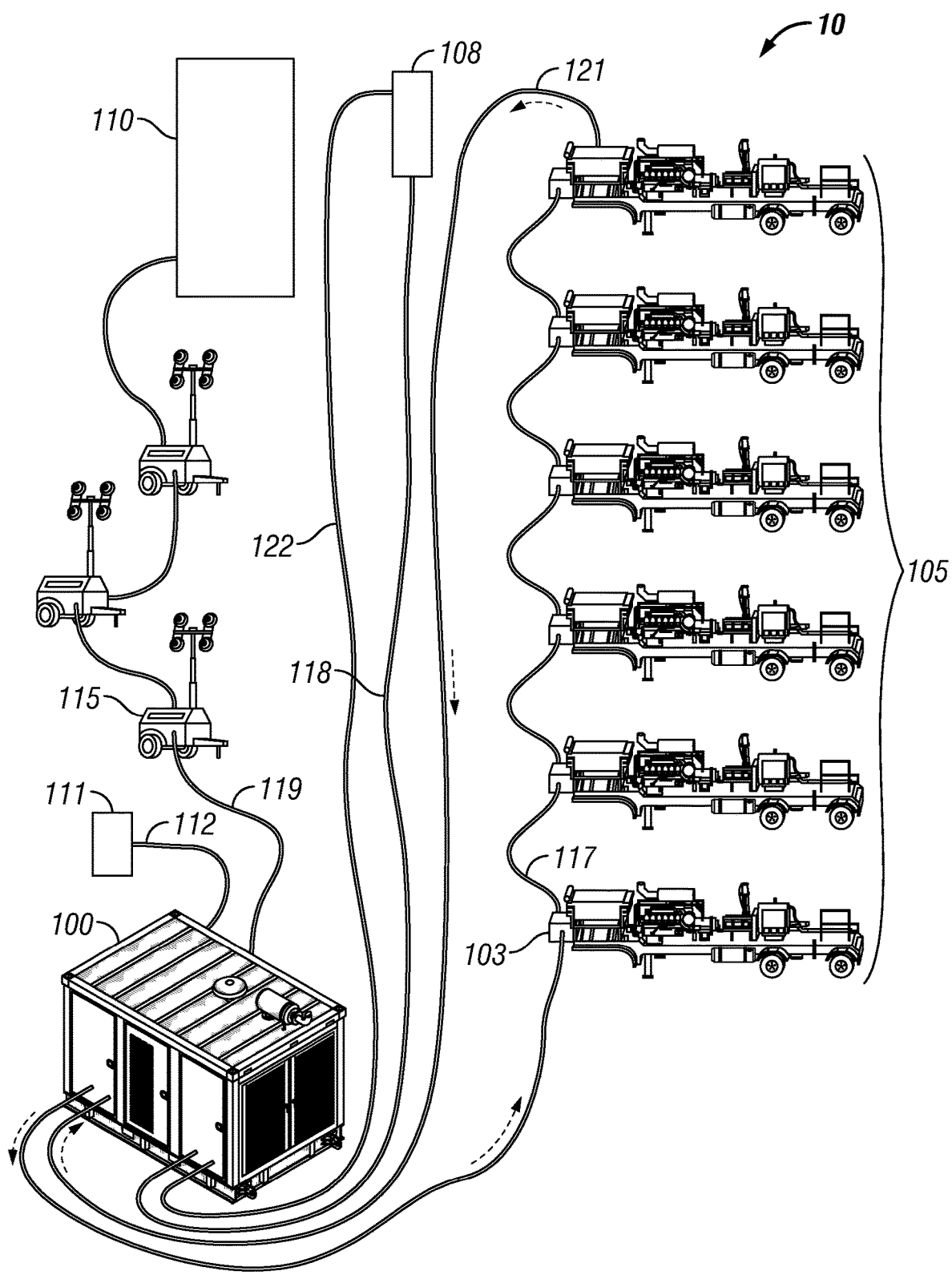
FIG. 2 is a simplified plan view of an embodiment of a power delivery system layout employing the power system for fracturing operations.

With attention to FIG. 2, in one embodiment the present system 10 may include a single fixable or portable power system 100 that is operationally configured to supply hydraulic power and electrical power simultaneously to frac spread equipment at a well site for fracturing operations. Suitably, the power system 100 is operationally configured to (1) supply hydraulic power to a single transportable pumping unit or a bank of transportable pumping units (hereafter "frac pumps 105"), (2) supply hydraulic power to one or more hydraulic power tools 108, (3) supply pneumatic power to one or more pneumatic power tools 111 via conduit 112 or as a general air supply and (4) supply electric power to various frac spread equipment, e.g., a data van 110, one or more lighting towers 115 as well as other equipment or items requiring electric power. The power system 100 may supply hydraulic power, pneumatic power and electric power simultaneously—including, in one embodiment, the supplying of hydraulic power via multiple PTOs. In the alternative, the power system 100 may supply for asynchronous operation of hydraulic power and electric power—including asynchronous operation of hydraulic power via multiple PTOs.

Figure 3:
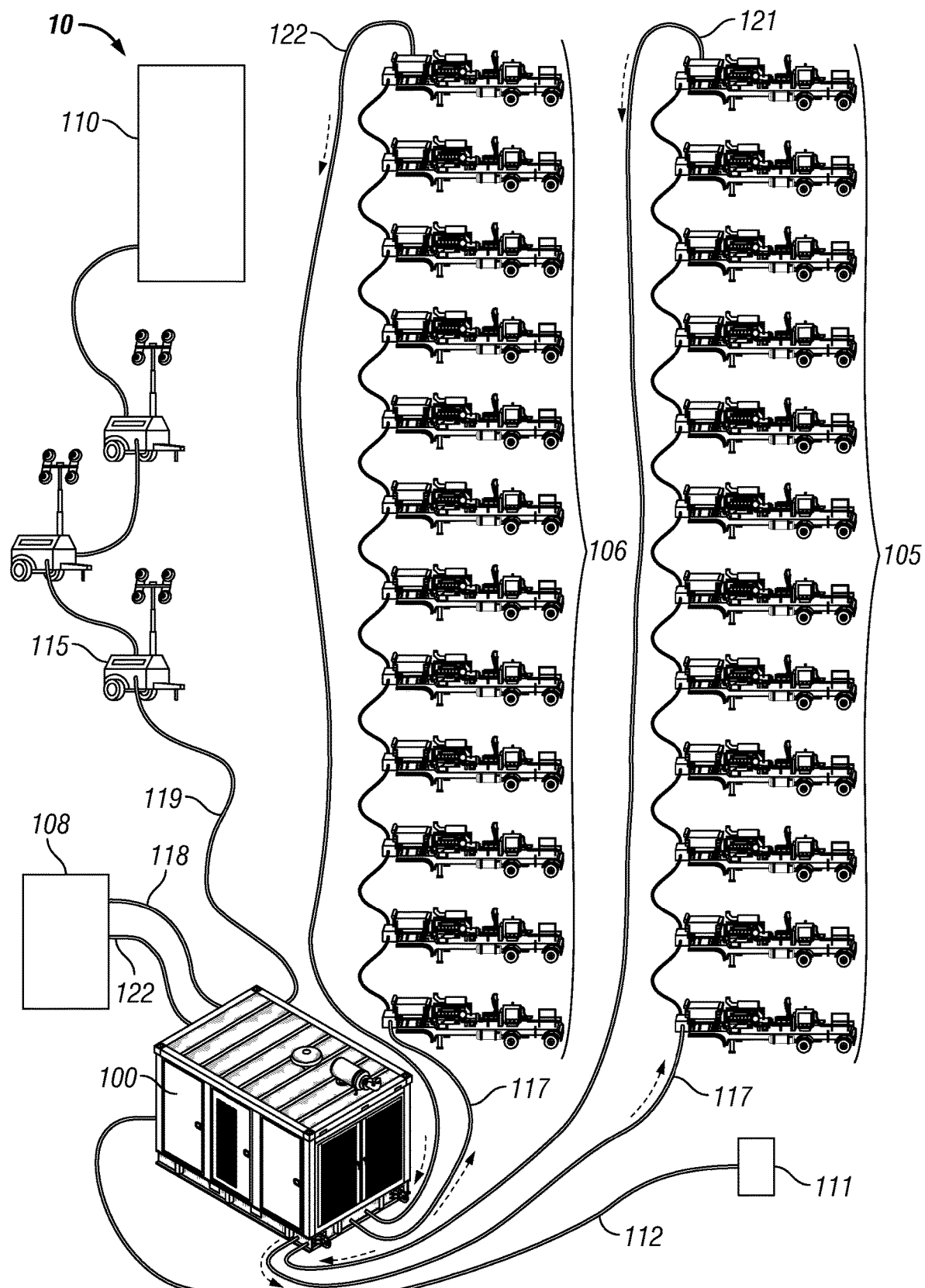
FIG. 3 is a simplified plan view of an embodiment of a power delivery system layout employing the power system for fracturing operations.
Figure 4:
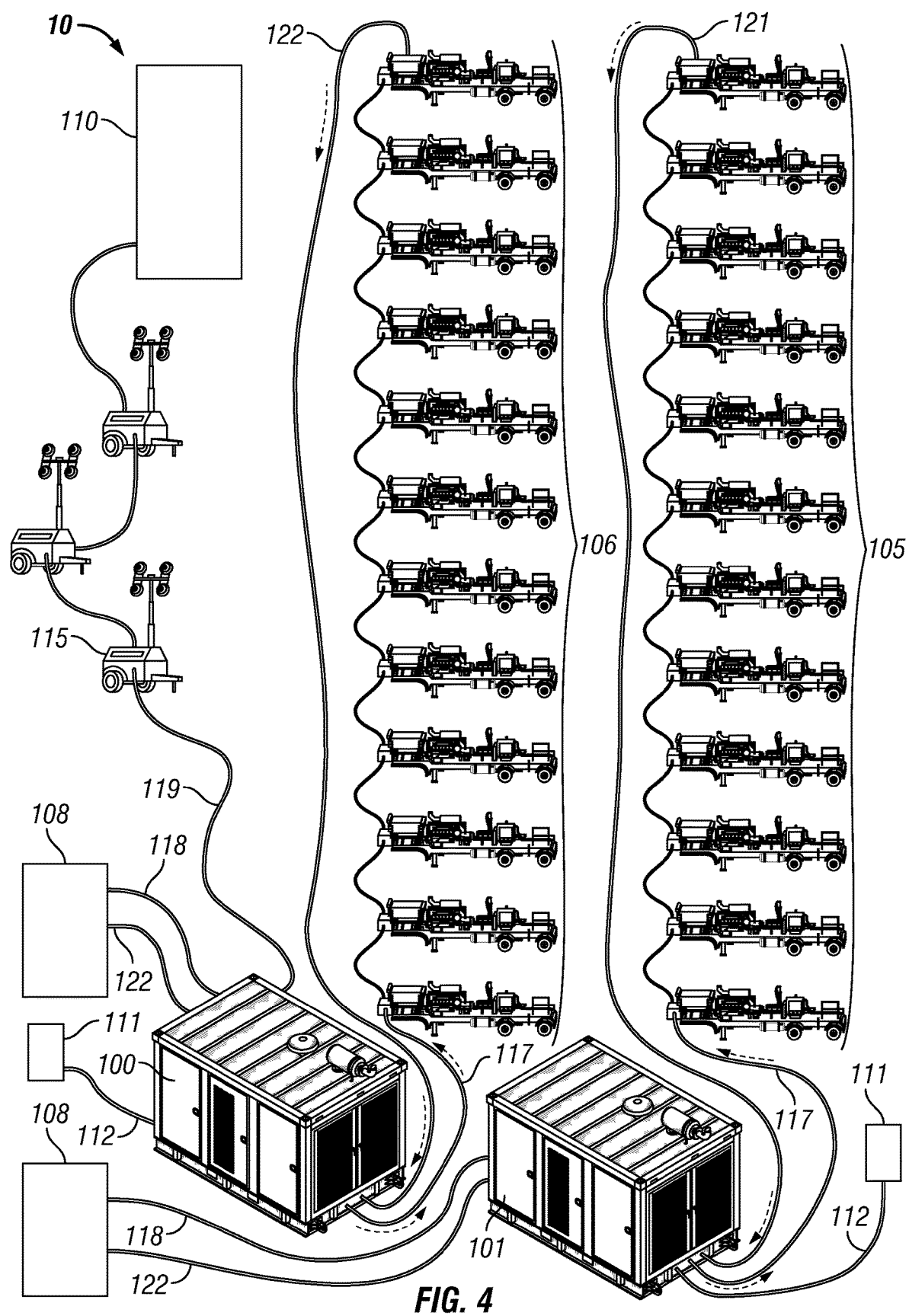
FIG. 4 is a simplified plan view of an embodiment of a power delivery system layout employing the power system for fracturing operations.
Figure 5:
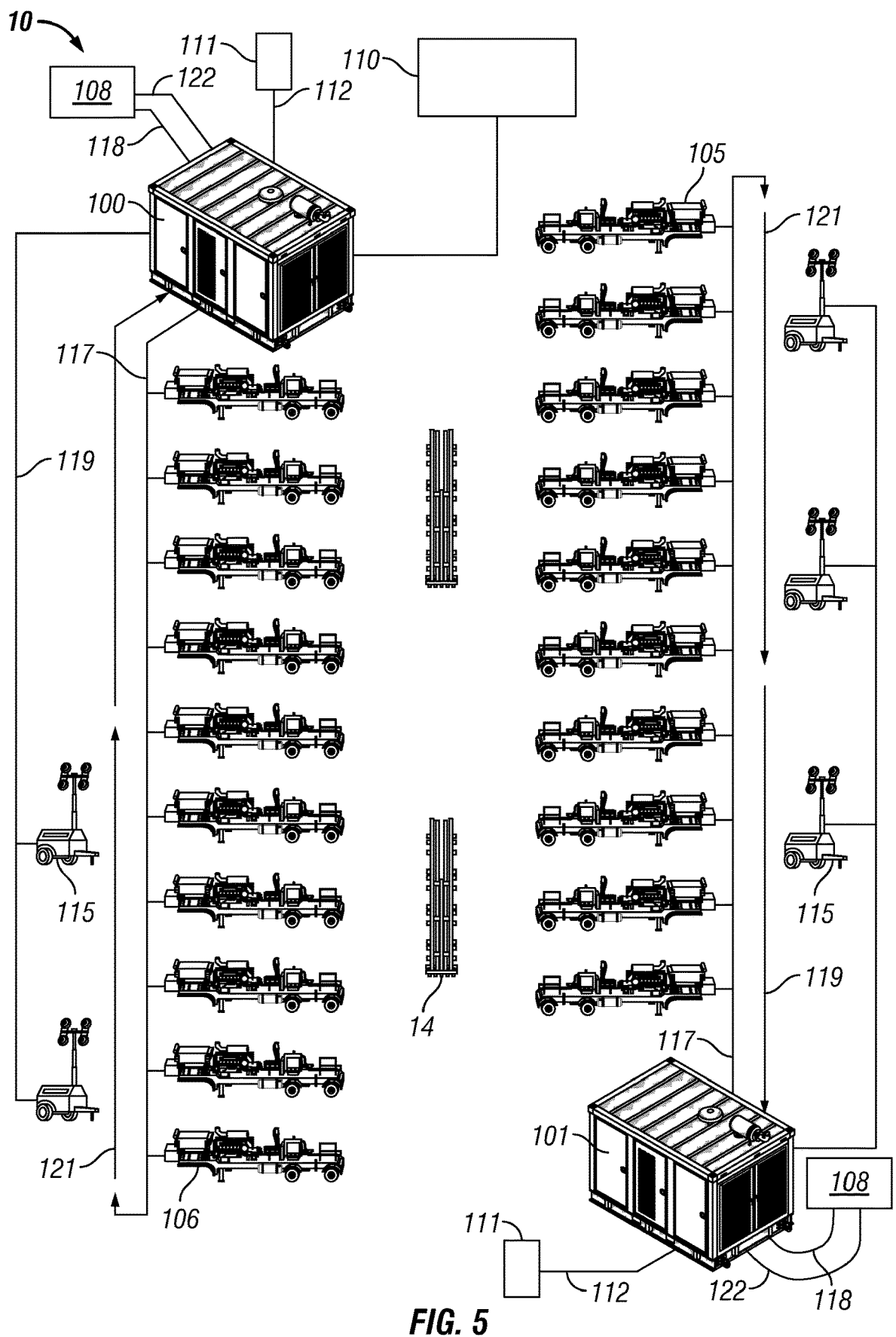
FIG. 5 is a simplified plan view of an embodiment of a power delivery system layout employing the power system for fracturing operations.

Turning to FIG. 3, in another implementation the invention may include a system having a single portable power system 100 that is operationally configured to (1) supply hydraulic power to two or more banks of frac pumps 105, e.g., a right hand pump bank 105 and a left hand pump bank 106, (2) supply hydraulic power to one or more hydraulic power tools 108, (3) supply pneumatic power to one or more pneumatic power tools 111 via conduit 112 by discharging air or as a general air supply, and (4) supply electrical power to various frac spread equipment, e.g., a data van 110, one or more lighting towers 115 as well as other equipment or items requiring electric power. In still another embodiment, a right hand pump bank may be powered via a first power system and a left hand pump bank may be powered via a separate second power system. For example, as shown in FIG. 4, a system of this application may include a first power system 100 that is operationally configured to (1) supply hydraulic power to one or more frac pumps, e.g., a left hand pump bank 106, (2) supply hydraulic power to one or more hydraulic power tools 108, (3) supply pneumatic power to one or more pneumatic power tools 111 via conduit 112 or as a general air supply and (4) supply electrical power to various frac spread equipment, e.g., a data van 110, one or more lighting towers 115 as well as other equipment or items requiring electric power. In this embodiment, the system may also include a second power system 101 that is operationally configured to (1) supply hydraulic power to one or more different frac pumps, e.g., a right hand pump bank 105, (2) supply hydraulic power to one or more hydraulic power tools 108 and (3) supply pneumatic power to one or more pneumatic power tools 111 via conduit 112 or as a general air supply. As shown in FIG. 5, the second power system 101 may also supply electrical power to various frac spread equipment such as one or more lighting towers 115 as desired or otherwise demanded according to operation requirements.

As seen in FIG. 2, a suitable power system 100 lies in fluid communication with each of the frac pumps 105 in a closed loop configuration via at least a fluid conduit or fluid conduit assembly 117 that is effective to deliver hydraulic fluid, a.k.a., "hydraulic oil" or "working fluid" from one or more hydraulic fluid storage reservoirs to each of the frac pumps 105 for pump activation and return the hydraulic fluid back to the one or more hydraulic fluid storage reservoirs of the power system 100 via a similar return flow line 121. As shown, the power system 100 may also lie in fluid communication one or more hydraulic power tools 108 in a closed loop configuration via a separate fluid conduit or fluid conduit assembly 118 effective to deliver hydraulic fluid to one or more hydraulic power tools 108 and return the hydraulic fluid back to a storage reservoir of the power system 100 via a similar return flow line 122. As such, a power system 100 of this application may include a primary hydraulic PTO and a secondary hydraulic PTO. Likewise, the power system 100 may be operationally configured to simultaneously generate electricity to power one or more items of equipment via an electrical line assembly 119 comprised of one or more electrical conduits. In another embodiment, the power system 100 may serve as a transfer pump operationally configured to convey hydraulic fluid to one or more downstream locations, e.g., convey hydraulic fluid deliverable to the frac pumps 105 and/or the one or more hydraulic power tools 108 downstream to one or more downstream locations in addition to or in place of returning hydraulic fluid via the return flow lines 121, 122.

Suitable fluid conduit assemblies 117, 118 and return flow lines 121, 122 may include, but are not necessarily limited to combinations or strings of sectional fluid conduit members and valves in fluid communication with the power system 100. One suitable sectional conduit member may include, but is not necessarily limited to stainless steel pipe, flexible hydraulic hose (rated for the maximum pressure of the hydraulic circuits), and combinations thereof. Suitable valves include, but are not necessarily limited to isolation valves. Suitable isolation valves include, but are not necessarily limited to control valves as understood by the skilled artisan. As discussed below, isolation valves may be operated manually and/or remotely with the aid of a controlling device affixed to the isolation valve, e.g., a pneumatic actuator or an electric motor. One commercially available isolation valve for use herein includes, but is not limited to single and double solenoid operated valves under the trade name VIKING XTREME® commercially available from Parker Hannifin Corporation, Cleveland, Ohio, U.S.A.

As shown in the simplified illustration of FIG. 2, frac pumps 105 are typically set up in line left to right whereby sectional fluid conduit members are interconnected via fittings, connectors and isolation valves 103 in a manner effective to operationally control the flow of hydraulic fluid to each of the frac pumps 105. As recognized by persons of ordinary skill in the fracking industry, this type of interconnecting of frac pumps 105 via a fluid conduit assembly 117 is often referred to as "daisy chaining." In one particular embodiment, the conduits, connectors and isolation valves may be of the quick disconnect type as understood by persons skilled in the art fluid conduit connectors. Also, although not necessarily required, the sectional fluid conduit members may be of substantially equal length and diameter allowing for ease of use of any spare sectional fluid conduit members anywhere along the hydraulic sub-system.

In regard to the delivery of electric power, the electrical line assembly 119 may include those types of electrical conduits commonly used in fracturing operations. Suitable, electrical lines for use herein may include, but are not necessarily limited to common electrical cord, flexible impact resistant electric cable, flexible impact resistant electric wiring, extension variations of each, and combinations thereof. One suitable electrical line may include flexible electric cable having an abrasion resistant outer jacket.

Figure 6:
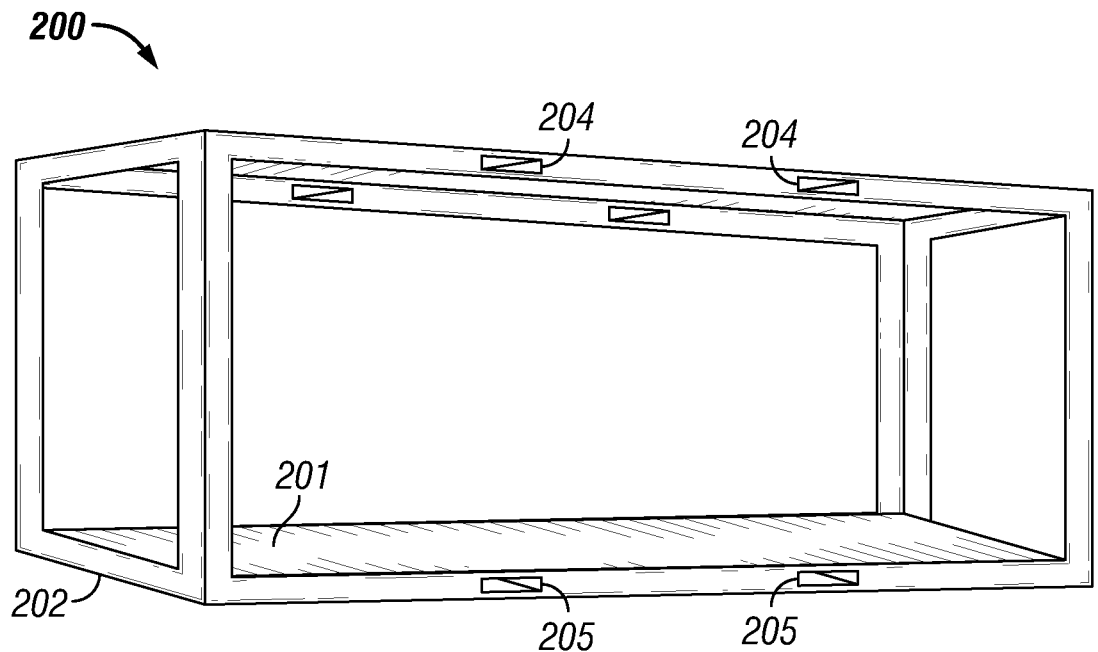
FIG. 6 is a simplified illustration of an embodiment of a chassis of a power system of this application.

A suitable power system 100 of this application is provided as a portable module type assembly having a primary power source and a plurality of secondary power sources. With attention to FIG. 6, one power system 100 may include a main support framework or chassis 200 operationally configured to house the remaining component parts and equipment of the power system 100 on a chassis floor 201 therein. To this end, one suitable chassis 200 may include a box type framework including a planar bottom side 202 providing for a substantially level orientation atop of one or more substantially level support surfaces such as bare ground, a floor, a roof of a structure, a trailer bed or other platform such as a tandem axle chassis, a concrete platform or wooden platform or pallet. In one embodiment, the bottom side 202 may be defined by the bottom most perimeter framework of the chassis 200 including a raised floor 201 as shown in FIG. 6. In another embodiment, the chassis 200 may include a solid wall type member wherein the inner surface of the wall type member forms the floor 201 and the outer surface forms the bottom side 202 of the power system 100. In still another embodiment, the bottom side 202 may include a wall type member having one or more holes there through, e.g., for ventilation, drainage of fluids, for weight reduction, bolting or otherwise securing the chassis 200 to a support surface via one or more fasteners, etc. The bottom side 202 of the framework of the chassis 200 may also include one or more holes there through for purposes of bolting down or otherwise securing the chassis 200 to a support surface via one or more fasteners. For example, in one implementation the power system 100 may be permanently mounted to a flatbed trailer or the like. In still another embodiment, the floor 201 may be comprised of a grid type surface or the like effective to minimize the weight of the chassis 200.

Figure 7:
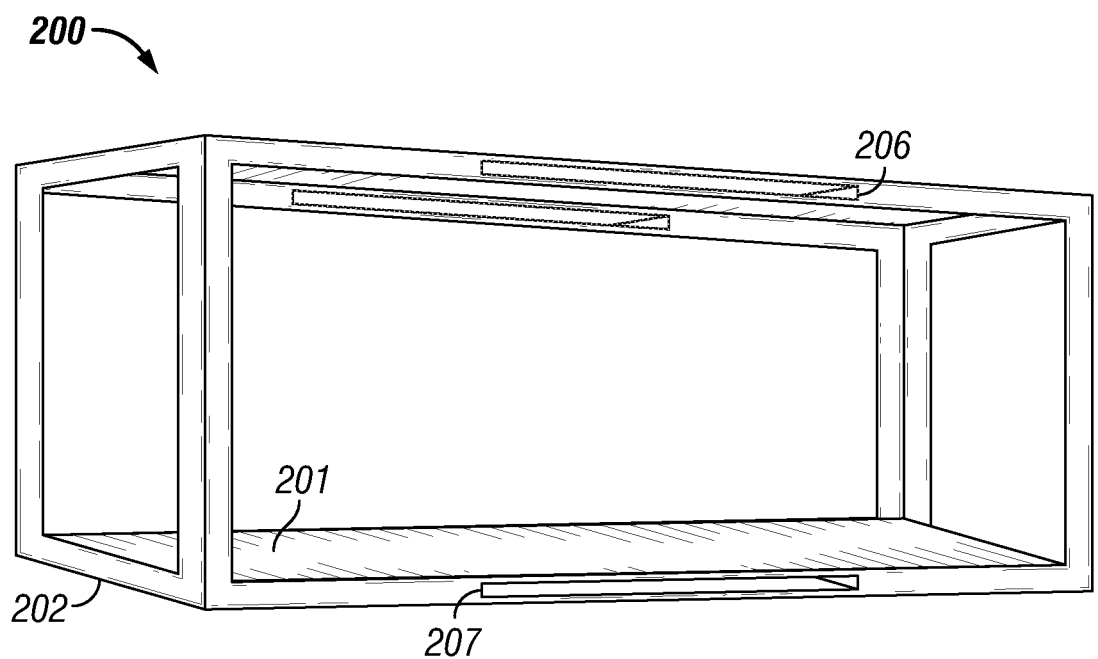
FIG. 7 is a simplified illustration of an embodiment of a chassis of a power system of this application.
Figure 8:
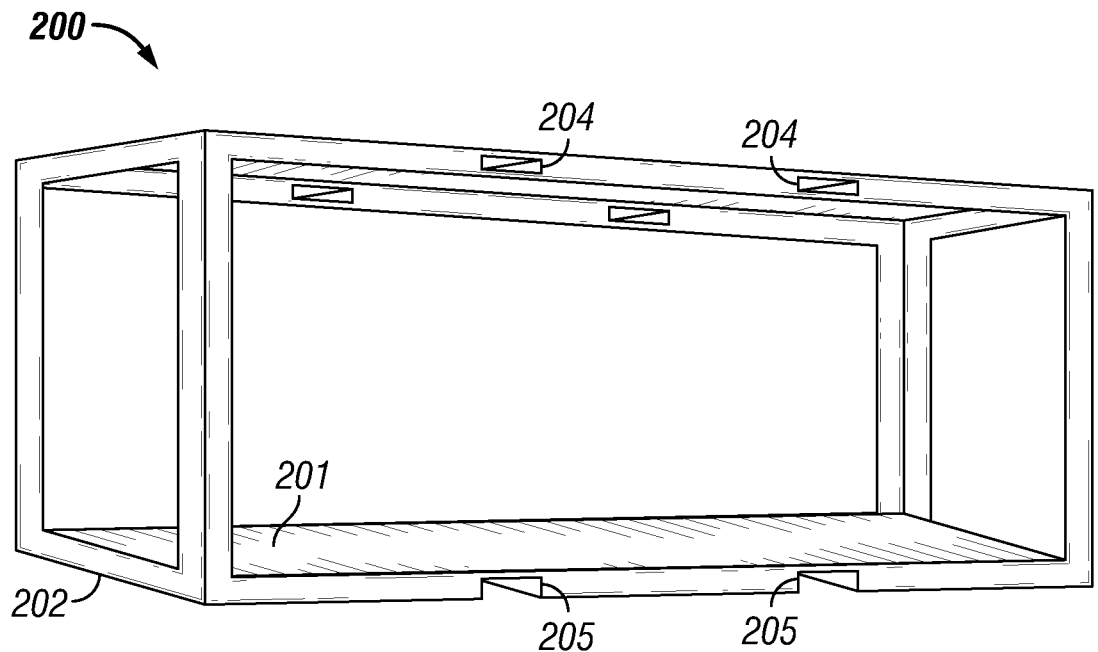
FIG. 8 is a simplified illustration of an embodiment of a chassis of a power system of this application.
Figure 9:
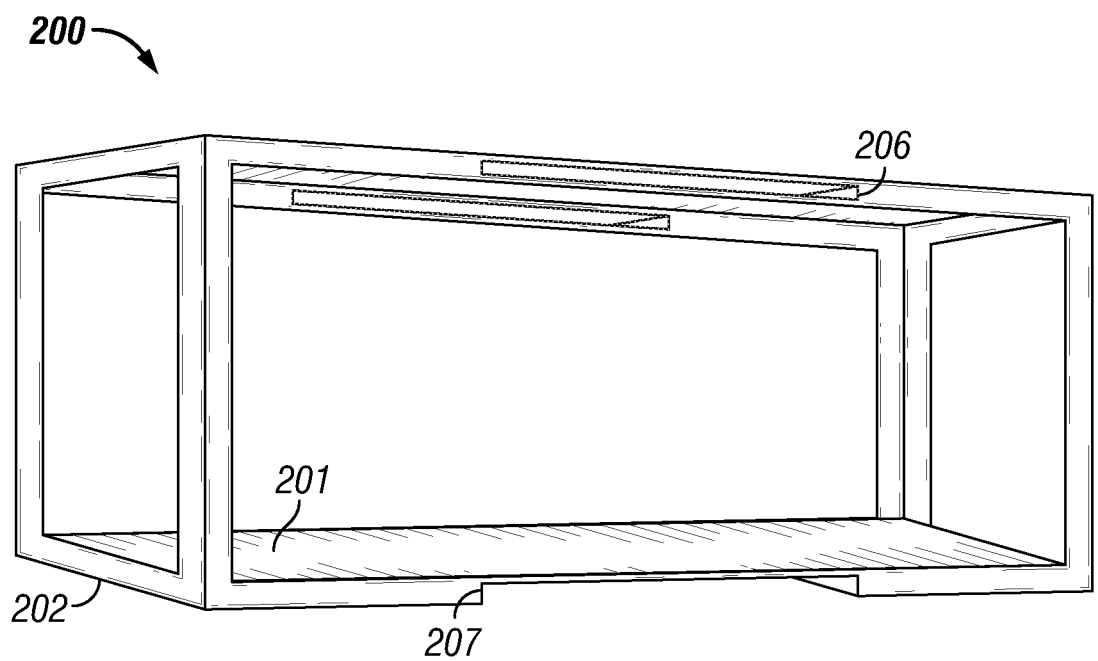
FIG. 9 is a simplified illustration of an embodiment of a chassis of a power system of this application.

As seen in FIG. 6, in one embodiment the chassis 200 may be operationally configured for portability, for example, operationally configured to be lifted for transport via one or more types of lifting equipment including, but not necessarily limited to mechanical lifts such as various types of forklifts, overhead cranes, hoists, and combinations thereof. For example, the chassis 200 may include one or more lifting type contact surfaces (1) upper openings or pockets 204 and/or (2) lower openings or pockets 205 on one or more sides of the chassis 200 for receiving individual forks of a forklift, or other type of lift, in a manner effective to move or transport the power system 100. In another embodiment as seen in FIG. 7, a chassis 200 may include a single upper opening 206 and/or a single lower opening 207 on one or more sides of the chassis 200 for receiving forks of a forklift, or other type of lift, in a manner effective to transport the power system 100. In another embodiment, the lower openings 205 or 207 may be provided as cutout sections as shown in FIGS. 8 and 9. It is further contemplated that any combination of the upper and lower openings or pockets described above may be implemented as desired on a particular chassis 200. Although not limited for use under any specified conditions, the upper openings 204 and 206 may be effective for use when the lower openings 205 or 207 are blocked off or otherwise inaccessible, e.g., if the power system 100 is set partially within a hole or resting on a flatbed trailer that has side walls or rails preventing use of the lower openings 205 or 207. In addition to lifting, each of the openings discussed above may also be used for the purpose of tying down or otherwise securing a chassis 200 during transport or use.

Figure 10:
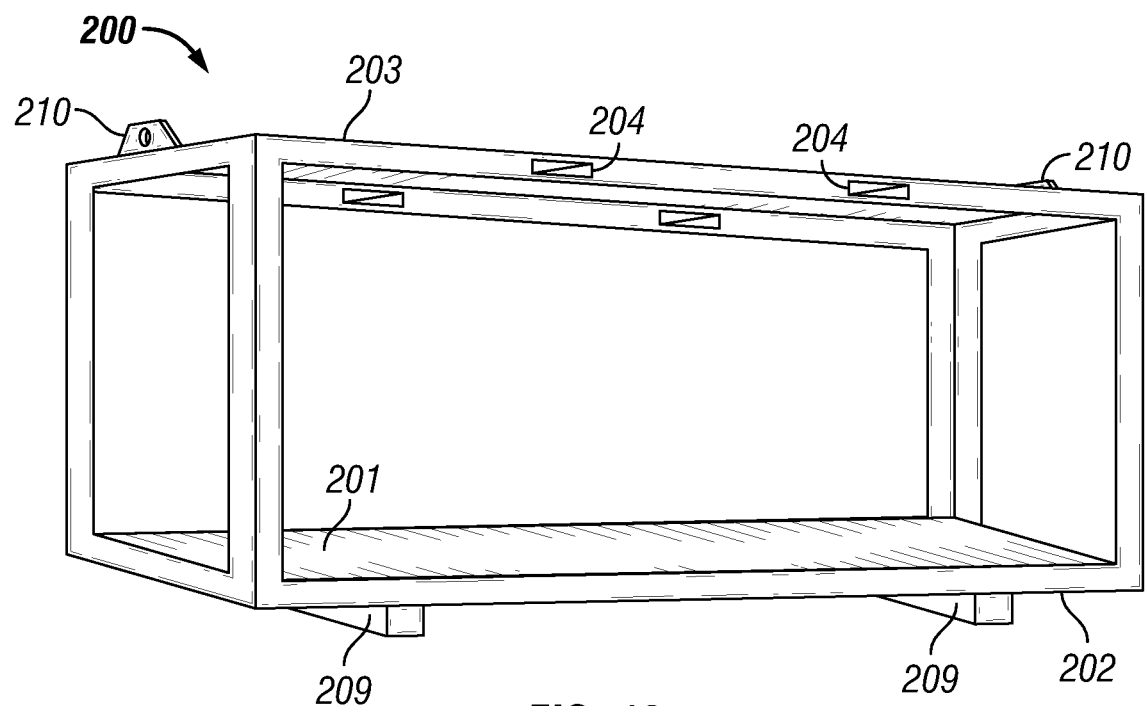
FIG. 10 is a simplified illustration of an embodiment of a chassis of a power system of this application.

Turning to FIG. 10, in still another embodiment, a chassis 200 may include elongated spacers or risers 209, legs, feet or the like along the bottom of the chassis 200 for raising the bottom of the chassis 200 up apart from a support surface providing room for forks of a forklift, or other type of lift, dolly or the like to extend below the chassis 200 in a manner effective to move the chassis 200 (see FIG. 10). As further shown in FIG. 10, the upper part 203 of the chassis 200 may also include one or more lifting type contact surfaces in the form of one or more lift eyes 210, handles, hook members, or the like for lifting and transporting the power system 100. In one particular embodiment, the upper part 203 of the chassis 200 may include a dual point lift in the form of lift eyes 210 on opposing sides of the chassis 200. The chassis 200 may also include lift eyes 210 on each side. Persons of ordinary skill in the art will appreciate that in still another embodiment a chassis 200 may include ISO corner fittings and twist locks similar as used on freight containers and the like for purposes of lifting and tying down the chassis 200. Suitable corner fittings and twist locks are commercially available from sources including, but not necessarily limited to TANDEMLOC, Inc., Havelock, N.C., U.S.A. As understood by the skilled artisan, at the time of this application other commercial sources of corner fittings and/or twist locks may be found via the World Wide Web at www.Alibaba.com. In still another embodiment, the framework of the chassis 200 may itself be used for lifting and/or transport purposes.

It is further contemplated that the chassis 200 may include casters for purposes of moving the power system 100 across support surfaces without the aid of a mechanical lift. In such embodiment, ISO container casters such as those commercially available from TANDEMLOC, Inc. may be used for mobilization of the power system 100 by attaching the casters to the ISO corner fittings of the chassis 200. As shown in the simplified example of FIG. 10, the chassis 200 may be provided as an open see through type of framework. In another embodiment, the chassis 200 may include one or more removable and/or permanent side walls, panels or hinged doors, e.g., lockable doors using rust-resistant pinned hinges, as desired or otherwise required per rules or regulations of a particular jurisdiction, effective as a housing for enclosing at least part of the chassis 200. In still another embodiment, the chassis 200 may include a drag bar with skid plates.

The chassis 200 is suitably constructed from one or more materials including but not necessarily limited to those materials resistant to chipping, cracking, excessive bending and reshaping as a result of ozone, weathering, heat, moisture, other outside mechanical and chemical influences, as well as various impacts and other loads placed on the chassis 200. Although the chassis 200 is not necessarily limited to any one particular material of construction, the chassis 200 is suitably constructed from one or more materials durable enough to support about 13,607.8 kg (30,000.00 pounds) or more during transport and/or operation without failing. In one particular embodiment, the chassis 200 complies with the DNV 2.71 and/or DNV 2.73 certification standards. Furthermore, the chassis 200 may be built to scale according to anticipated operational demands and/or the size and/or quantity and/or arrangement of operable components provided as part of the power system 100. Typically, the more horsepower required the larger, and heavier, the power system 100. For fracturing operations, the upper end power system 100 may include a weight of about 45,359.2 kg (about 100,000.0 pounds).

For fracking operations, suitable chassis 200 materials of construction may include one or more metals. Suitable metals include, but are not necessarily limited to aluminum, steel, titanium, and combinations thereof. In one particular embodiment, the chassis 200 may be constructed from stainless steel. In another particular embodiment, the chassis 200 may be constructed from mild steel. A metal chassis 200 may be fabricated from individual framework materials, e.g., section members or plank type members similar as other metal building materials and be assembled via bolts, welds, and combinations thereof as understood by the skilled artisan. In another embodiment, a chassis 200 may comprise smaller box type frame sections secured together. In still another embodiment, a complete chassis 200 or individual component parts comprising a chassis 200 may be produced via 3D printing or machined via computer numerical control ("CNC").

For fracking operations, the chassis 200 side walls, panels and hinged doors employed may be constructed from metals, plastics, rubbers, fibre-reinforced plastics, woods, acrylic glasses, and combinations thereof. Suitable metals include, but are not necessarily limited to aluminum, steel, titanium, and combinations thereof. One suitable steel includes galvanized sheet steel. Suitable plastics include, but are not necessarily limited to polyvinyl chloride ("PVC"), polyvinylidene fluoride ("PVDF"), polyethylene, polypropylene, chlorinated polyvinyl chloride ("CPVC"), and combinations thereof. Suitable rubbers include, but are not necessarily limited to styrene butadiene rubber ("SBR"). Suitable fibre-reinforced plastics include, but are not necessarily limited to fiber reinforced plastic. Suitable woods include, but are not necessarily limited to heat treated woods, weather treated woods, and combinations thereof. Likewise, the side walls, panels and hinged doors may include a painted finish, e.g., powder coat finish including, but not necessarily limited to a two coat polyester powder-coat finish. As such, the chassis 200 side walls, panels and hinged doors may include any color or combination of colors as desired or as otherwise required per legal standards. In addition, one or more side walls, panels or doors may be constructed from a transparent or translucent material such as acrylic plastic sheet material for providing viewing windows. In addition, the inner surfaces of the chassis 200 side walls, panels and hinged doors may be lined with one or more noise insulating materials to provide a sound proofed housing and/or heat insulating materials in blanket and/or board form. Suitable blanket type insulating materials may comprise fiber reinforced plastic, mineral, plastic fiber, natural fiber, and combinations thereof. Suitable board type insulating materials may comprise polystyrene, polyurethane, polyisocyanurate, and combinations thereof.

Suitably, the chassis 200 and ultimately the power system 100 of this application are not necessarily limited in size and weight but may vary according to the power requirements for one or more particular operations. Without limiting the invention, a power system 100 intended for hydraulic fracturing operations in locations such as North America may have a total weight ranging from about 544.0 kg to about 9,979.0 kg (about 1,200.0 pounds to about 22,000.0 pounds). In addition, a power system 100 intended for hydraulic fracturing operations in locations such as North America may include a chassis 200 and be provided as an enclosure or housing type structure ranging in size and having dimensions as listed in Table 1.

TABLE 1

|  | Length cm (inches) | Width cm (inches) | Height cm (inches) |
| --- | --- | --- | --- |
| Minimum Dimensions: | 182.88 (72.0) | 121.92 (48.0) | 152.40 (60.0) |
| Maximum Dimensions: | 457.20 (180.0) | 177.80 (70.0) | 243.84 (96.0) |

Figure 11:
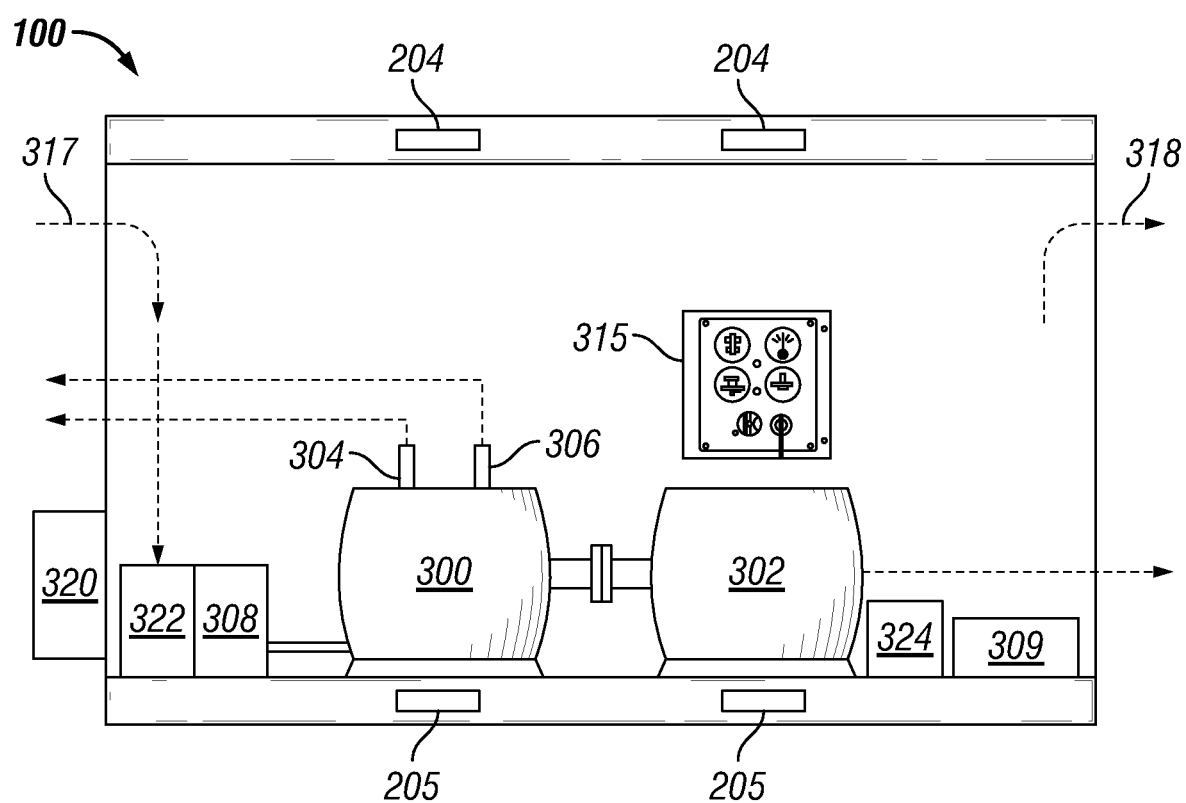
FIG. 11 is a simplified illustration of a power system of this application.
Figure 12:
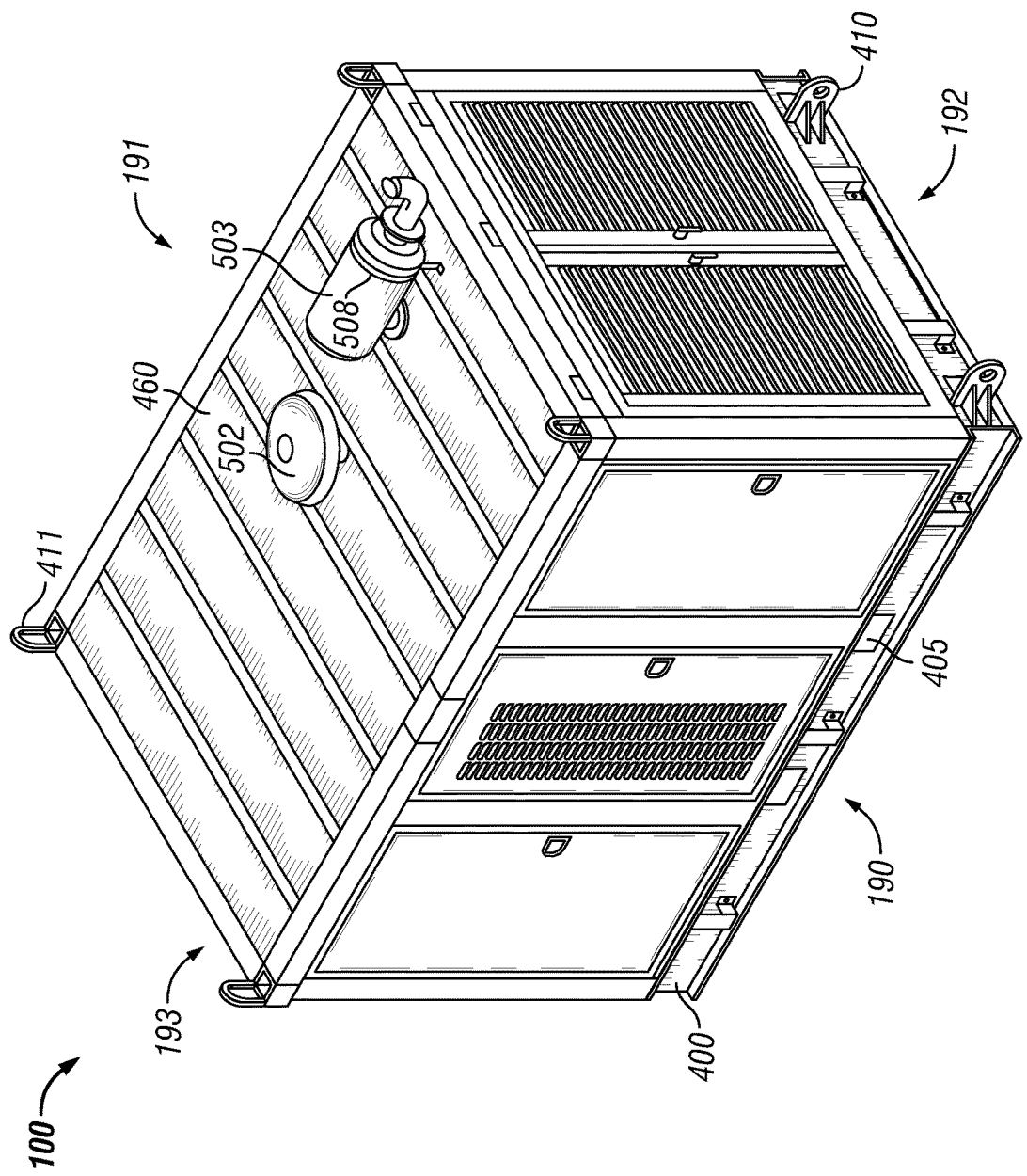
FIG. 12 is a top perspective view of an embodiment of a power system of this application.

For purposes of this application, a suitable power system 100 includes a hydraulic power supply system, an electric power supply system and a pneumatic power supply system including all hydraulic pump drives, one or more compressors supplying pneumatic power and one or more electric generators necessary to perform a particular fracturing operation while being designed and constructed to withstand an oilfield type environment. With reference to FIG. 11, one suitable power system 100 may include at least the following: (1) a primary power source 300, (2) an electric power supply system including an electrical generator 302 operatively communicated to the primary power source 300 acting as a feed source of electric power to the frac spread operation, (3) a hydraulic power supply system including (a) a first PTO and hydraulic feeder pump 304 coupled to the primary power source 300 for frac pump 105 operations and (b) a second PTO and hydraulic feeder pump 306 coupled to the primary power source 300 for hydraulic power tool operations, (4) a fuel storage reservoir or fuel tank 308 with closeable inlet and fuel housed therein, (5) one or more storage boxes 309 for tools, supplies, food, beverages, fire extinguishers, and/or other desired items, (6) the system controller or "control circuitry" including a control panel 315, (7) a main engine air inlet or intake 317, (8) a main air outlet 318, (9) drip pan (not shown), (10) an engine guard (not shown), (11) exhaust system (not shown), (12) cooling system (not shown) (13) lube system (not shown), (14) starting system (not shown), (15) charging system (not shown), (16) hydraulic fluid storage unit or "hydraulic reservoir" of the hydraulic power supply system (not shown), (17) pipe mounts (not shown) within the chassis 200 for receiving hydraulic lines in fluid communication, (18) a service cabinet type member 320 mounted on the outside of chassis 200 for housing all fuel and hydraulic filters within one self-contained locale for ease of maintenance and repair of the same, (19) air intake filters 322 that are suitably mounted together and accessible for maintenance from ground level, (20) one or more light sources (not shown) disposed along the outer surface(s) of the power system 100 and (21) a pneumatic power supply system compressor 324. The power system 100 is suitably provided with one or more power transmission outlets or outlet connections for the transmission of hydraulic fluid, electricity and air pressure from each of the hydraulic power supply system, electric power supply system and pneumatic power supply system to various items located external the power system 100 requiring hydraulic power and/or electric power and/or pneumatic power. The system controller is electronically communicated with the primary power source 300, the electric power supply system including an electrical generator 302, hydraulic power supply system, electric power supply system and pneumatic power supply system of the power system 100. The power system 100 of this application may be controlled locally or remotely and automatically or manually, and may operate continuously or intermittently. As understood by persons of ordinary skill in the art, electronically communicated data may be transmitted between the system controller and the primary power source 300, the electric power supply system including an electrical generator 302, hydraulic power supply system, electric power supply system and pneumatic power supply system for controlling and monitoring power system 100 operations. The system controller may also be programmed to shut down the power system 100 for scheduled maintenance.

The primary power source 300 and electrical generator 302 may be provided as a single unit referred to herein as a "gas turbine generator," "electric power generation set," "generator set" or "gen set" provided with or without an enclosure as understood by persons of ordinary skill in the art. In such embodiment, the primary power source 300 suitably includes an internal combustion engine, e.g., compression-ignition engine, spark-ignition engine, operated using hydrocarbon fuel. A suitable compression-ignition engine includes a diesel engine. A suitable spark-ignition engine includes a gasoline engine. For typical hydraulic fracturing operations, a suitable engine may have (1) a package weight from about 544.3 kg to about 11,339.8 kg (about 1,200.0 pounds to about 25,000.0 pounds), (2) a rated speed from about 650.0 rpm to about 2,200.0 rpm and (3) a rated power from about 8.0 hp to about 1,500 hp. A comparable natural gas engine may also be employed as desired or as otherwise required. Likewise, an electrical generator may be employed as a primary power source where desired, e.g., a permanent installation of the power system 100.

A suitable hydrocarbon fuel tank 308 may range in volume from about 94.6 liters to about 3028.3 liters (about 25.0 gallons to about 800.0 gallons). For hydraulic fracturing operations, one suitable electrical generator 302 may have an electrical output from about 50.0 Hz to about 60.0 Hz. Exemplary engines for use as the primary power source 300 may include one of a plurality of commercially available engines, including, but not necessarily limited to engines and generator sets manufactured by Caterpillar, Inc., Peoria, Ill., U.S.A., such as engines having a lower end power rating like the Caterpillar® C4.4, In-line 4, 4-cycle diesel engine up to the Caterpillar® C32 V-12, 4-stroke water-cooled diesel engine and equivalent. One particular engine that may be employed for fracturing operations includes a Caterpillar® C7.1 ACERT® Tier 4 Diesel Engine.

In an embodiment where the primary power source 300 is provided as part of a generator set, a suitable electrical generator 302 is operationally configured to match the performance and output characteristics of the corresponding engine. As understood by persons of ordinary skill in the art of generator sets, companies such as Caterpillar, Inc., make available software operationally configured to match a particular electrical generator 302 with a particular power source 300 by considering factors such as operation site conditions, load characteristics and required performance. Gas and diesel generator sets for use herein are also commercially available from MTU Onsite Energy Corporation, Mankato, Minn., U.S.A.

The power system 100 of FIG. 11 suitably includes one or more hydraulic fluid pumps, each hydraulic fluid pump corresponding to a separate PTO of the primary power source 300. One hydraulic pump is fluidly communicated with the frac pumps 105 provided wherein the hydraulic pump is operationally configured to provide hydraulic power to start the frac pumps 105 for fracturing operation purposes. The power system 100 includes a wholly separate second hydraulic pump suitably provided for powering hydraulic power tools. Although the hydraulic pumps employed as part of the embodiment as shown in FIG. 11 are two independent pumps, both pumps may receive oil from a common hydraulic reservoir of the power system 100. Additional PTOs and hydraulic pumps may be added to the power system 100 as part of a backup system in a scenario where either the first or second hydraulic pump fails.

Each of the members of the power system 100 described above may be oriented and/or located within the chassis 200 perimeter as desired. Although the fuel tank 308 in FIG. 11 is shown resting on the floor 201, in another embodiment the fuel tank 308 may be mounted on the bottom of the chassis 200 underneath the floor 201. Storage boxes 309 are suitably rectangular, e.g., square, and may vary in size according to chassis size limitations. In another embodiment, one or more storage boxes 309 may be located external the chassis 200 along one or more side walls of a chassis 200.

The one or more light sources may include, but are not necessarily limited to incandescent lighting (including halogen lighting), fluorescent lighting, light emitting diodes ("LED"), and combinations thereof disposed on each side of the power system 100 and on the chassis 200 to provide sufficient illumination of the ambient surroundings during low light conditions, inside darkness or during outside darkness hours, e.g., nighttime. LEDs may be provided in the form of LED strip lights and/or lamps. Lighting may also be provided in one or more colors as desired. For example, in addition to one or more light sources provided for illumination purposes, one or more additional light sources may be provided employing differing colors operationally configured as visual signals as to one or more operating conditions of the power system 100. For example, a first light source may be communicated with the control circuitry and illuminate a first color effective as an indicator that the power system 100 is in operation mode. A second light source may be communicated with the control circuitry and illuminate a second color effective as an indicator that the power system 100 is in an OFF mode. Another light source may be communicated with the control circuitry and provided to illuminate a third color as a visual signal that the power system 100 has malfunctioned or is not operating according to standard operating procedure as programmed. The outer surface of the power system 100 may also include glow in the dark tape disposed thereon, e.g., to help mark the borders of the power system 100 in low light and dark moments. It is further contemplated that the power system 100 be provided with one or more audible alarms communicated with the control circuitry as desired in addition to visual signals or employed without visual signals.

Regarding the control circuitry, the control panel 315 may include, for example, a preset program local controller mounted for ease of operation by personnel in local mode. The power system 100 may also include remote diagnostics to allow one or more components, e.g., the major components, to be monitored remotely, including, but not necessarily limited to the primary engine, transmission, hydraulics and PTOs.

Another embodiment of the power system 100 is described with reference to FIGS. 12-31. In this embodiment, the main support framework includes a platform or floor provided as a rectangular portable support skid (hereafter "skid member 400") operationally configured to support the remaining support framework and operable components of the power system 100 thereon. Suitably, the dimensions and/or one or more materials of construction of the skid member 400 may vary according to the type of power system 100 to be provided for one or more operations. As such, the skid member 400 may vary in height, length, width, material thickness and total weight. To this end, similar sized skid members 400 may vary in weight, for example, a first skid member 400 intended for high stress operations may be constructed from one or more heavy and/or durable materials (e.g., steel) compared to a second skid member 400 intended for less stressful operating conditions (e.g., aluminum).

Figure 13:
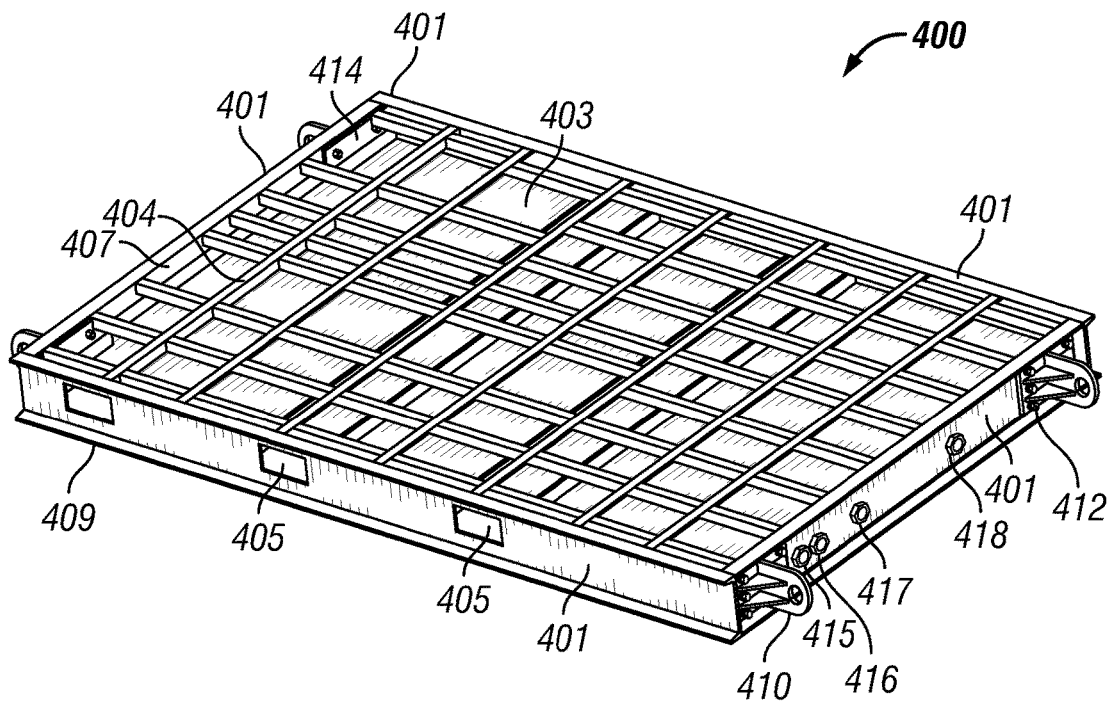
FIG. 13 is a top perspective view of an embodiment of a skid member of the power system of FIG. 12.

As shown in FIG. 13, the skid member 400 of this embodiment includes a raised perimeter framework 401 or "sidewall" comprised of individual perimeter members defining the four sides and the height of the skid member 400. The skid member 400 also includes a bottom floor 403, or bottom surface, and an upper floor 404, or upper surface, spaced apart from the bottom floor 403. As shown, the upper floor 404 may include a grid type support surface effective to minimize the weight of the skid member 400. In addition, a grid type upper floor 404 allows fluids such as working fluids of the various operable components of the power system 100, e.g., fuel, oil, hydraulic fluid, grease, water, due to gravity to be directed past the upper floor 404 where it is collected and contained by the bottom floor 403. Collected fluids may be removed from the skid member 400 via a sealable aperture or "master drain 415" disposed along the perimeter framework 401. The skid member 400 may include other drains as desired. For example, the skid member 400 may include a fuel tank drain 416 in fluid communication with the fuel tank 520 via a fluid conduit for the removal of fuel from the fuel tank 520; an engine oil drain 417 in fluid communication with the primary power source 300 via a fluid conduit; and a coolant drain 418 in fluid communication with a radiator 514 of the primary power source 300 via a fluid conduit. In this embodiment the fuel tank drain 416, engine oil drain 417 and coolant drain 418 are suitably fitted with hose connected to a ball valve and all of the drains suitably include a threaded opening for receiving a threaded drain plug or equivalent therein for sealing each of the drains. Without limiting the invention, one suitable drain plug includes an automotive type oil pan drain plug. In one embodiment, the drains may include 1.27 cm (0.5 inch) weld on half couplings.

In an embodiment intended for fracturing operations, the individual members or sections defining the perimeter 401 may be provided as metal beam members including, but not necessarily limited to channel beams, standard I-beams, angle beams, flat bar beams, tee bar beams, wide flange beams, rectangular tubing, and combinations thereof. In the embodiment of FIG. 13, the individual members or sections defining the perimeter 401 include metal channel beams secured to the upper surface of the bottom floor 403 and secured to one another at the four corners of the skid member 400 via welds, fasteners, and combinations thereof. As further shown, the upper floor 404 is suitably secured to the inner surface 407 of the perimeter framework 401 in a manner to provide a substantially planar upper surface of the skid member 400 from one end to an opposing end of the skid member 400. In one embodiment, the upper floor 404 may be secured to the inner surface 407 via welds. In another embodiment, the inner surface 407 may include female type cavities for receiving male members of the upper floor 404 therein. In still another embodiment, the upper floor 404 may be secured to the inner surface 407 via fasteners including, but not necessarily limited to screws, bolts, pins, and combinations thereof. For fracturing operations, suitable fasteners may be constructed from stainless steel, mild steel, zinc-plated fasteners, and combinations thereof.

Figure 14:
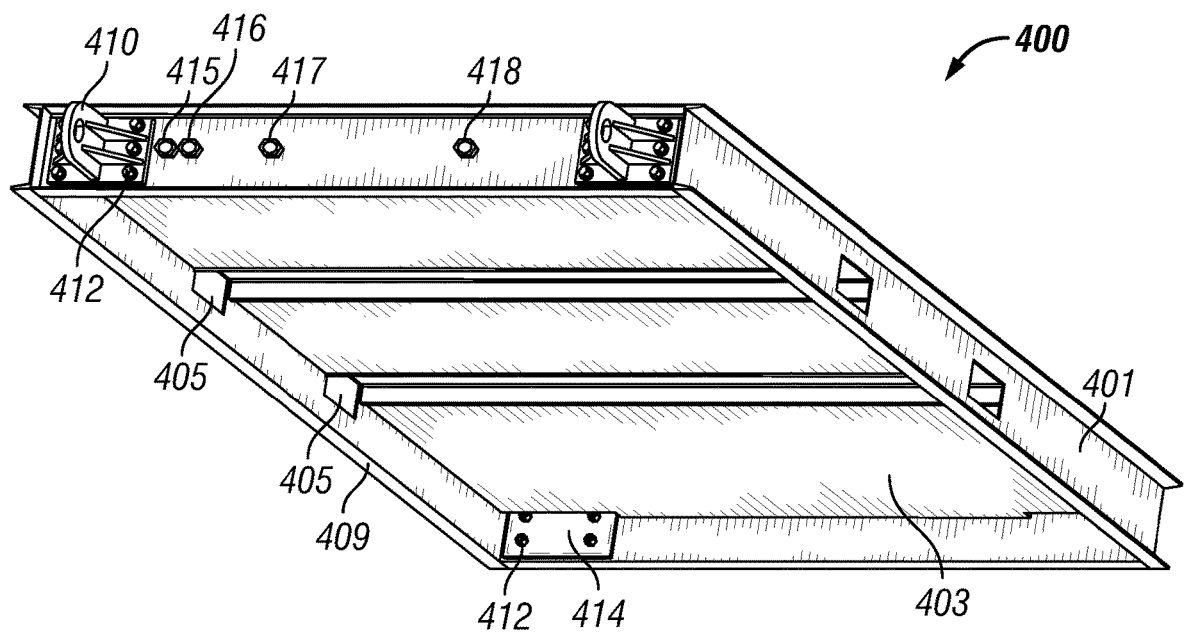
FIG. 14 is a bottom perspective view of the skid member of FIG. 13.

Suitably, the skid member 400 includes a planar type bottom side 409 providing for a substantially level bottom surface orientation for resting atop one or more substantially level support surfaces such as bare ground, a floor, a roof of a structure, a trailer bed or other platform such as a concrete platform or wooden platform or pallet. In one embodiment, the bottom side 409 may be defined by the perimeter framework 401 as shown in FIG. 14. In another embodiment, the bottom side 409 may be defined by a bottom floor 403 secured to the bottom of the perimeter framework 401.

Similar as described above, the skid member 400 of this embodiment may include openings or pockets 405 on one or more sides of the skid member 400 for receiving individual forks of a forklift, or other type of lift, in a manner effective to move or transport the power system 100. The skid member 400 may also include one or more lower lift eyes 410 for lifting and/or transporting the power system 100. As depicted in FIG. 13, the skid member 400 may include at least four lift eyes 410 located near the corners of the skid member 400 for maintaining the power system 100 in a substantially level orientation as the power system 100 is being lifted and/or transported. In this embodiment, each of the lift eyes 410 is removably secured to the perimeter framework 401 via a plurality of fasteners 412, e.g., stainless steel, mild steel, zinc-plated nut/bolt type fasteners, and combinations thereof. As such, the perimeter framework 401 is suitably provided with a plurality of apertures for receiving fasteners there through. For additional structural support, backing members 414 such as plate members with apertures there through may be employed opposite corresponding lift eyes 410 for receiving distal ends of fasteners there through (see FIGS. 13 and 14).

Figure 15:
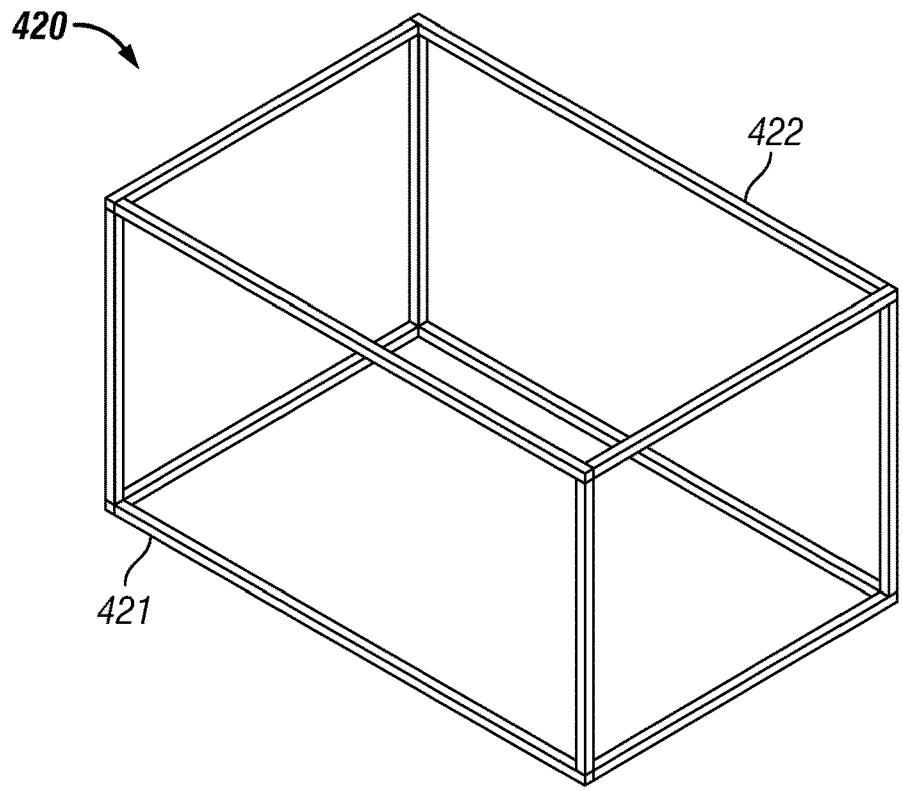
FIG. 15 is a top perspective view of an embodiment of a wall panel frame of the power system of FIG. 12.

Turning to FIG. 15, the main support framework of this embodiment may include a wall panel frame 420 including a rectangular base 421 mountable atop the skid member 400. The wall panel frame 420 may be provided as a one piece construction or provided as an assembly of individual elongated members secured together with fasteners as described herein. The wall panel frame 420 may be constructed from materials including, but not necessarily limited to stainless steel, mild steel, fiber reinforced plastic, and combinations thereof. In an embodiment operationally configured for fracturing operations, the elongated members may include carbon structural steel members according to ASTM A36.

Figure 16:
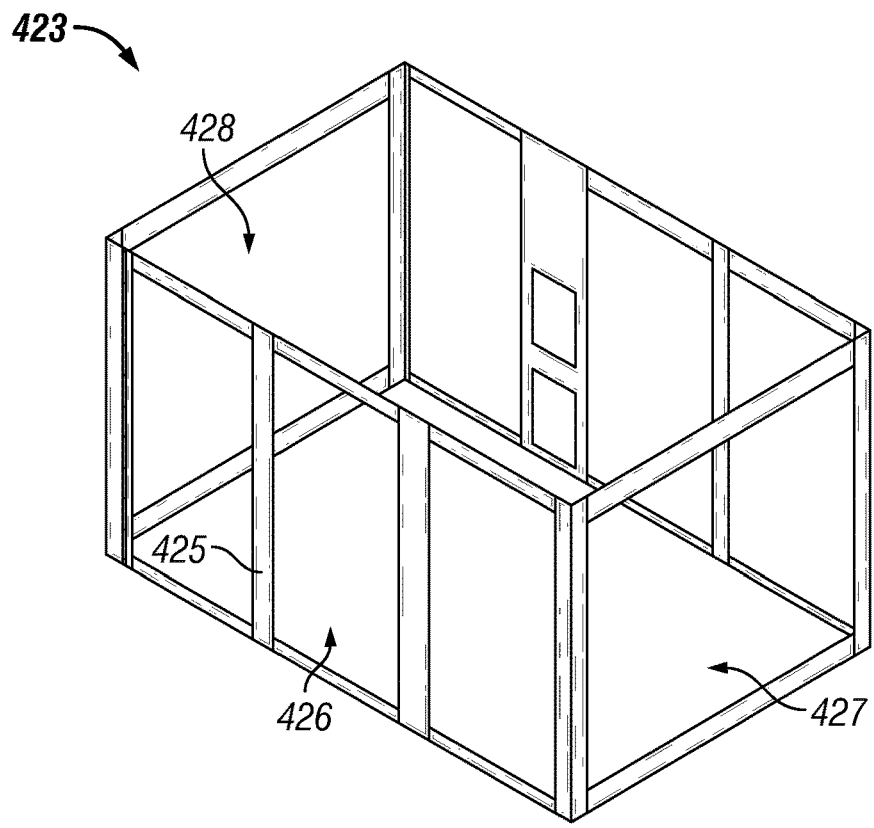
FIG. 16 is a top perspective view of an embodiment of a wall panel assembly of the power system of FIG. 12.

The wall panel frame 420 may include a box type framework as shown or a portion of a box type framework and one or more wall panels or wall panel assemblies supported thereon for forming an enclosure of operable components housed therein. One exemplary wall panel assembly 423 is shown in FIG. 16. In one embodiment, the wall panel assembly 423 may include a plurality of planar wall type members releasably attachable to the wall panel frame 420 via brackets 436 (see FIG. 19) and/or fasteners 437 such as rivets, screws, bolts and the like providing the base shell or housing of the power system 100. Suitable fasteners 437 include stainless steel, mild steel, zinc-plated fasteners, and combinations thereof.

In this embodiment, the wall panel assembly 423 includes various solid sections 425 covering at least part of the wall panel frame 420 and various open sections 426 operationally configured to receive doors, louvers, screens, windows, vents or operable equipment for completion of the housing for operation of the power system 100. The wall panel(s) of the wall panel assembly 423 may also include one or more liner materials as desired or as otherwise required. Suitably, the arrangement of solid sections 425 and open sections 426 correspond to a particular layout of operable components supported on the skid member 400 within the wall panel assembly 423. Other wall panel configurations are herein contemplated according to other particular layouts of one or more operable components supported on the skid member 400 within the wall panel assembly 423.

Figure 17:
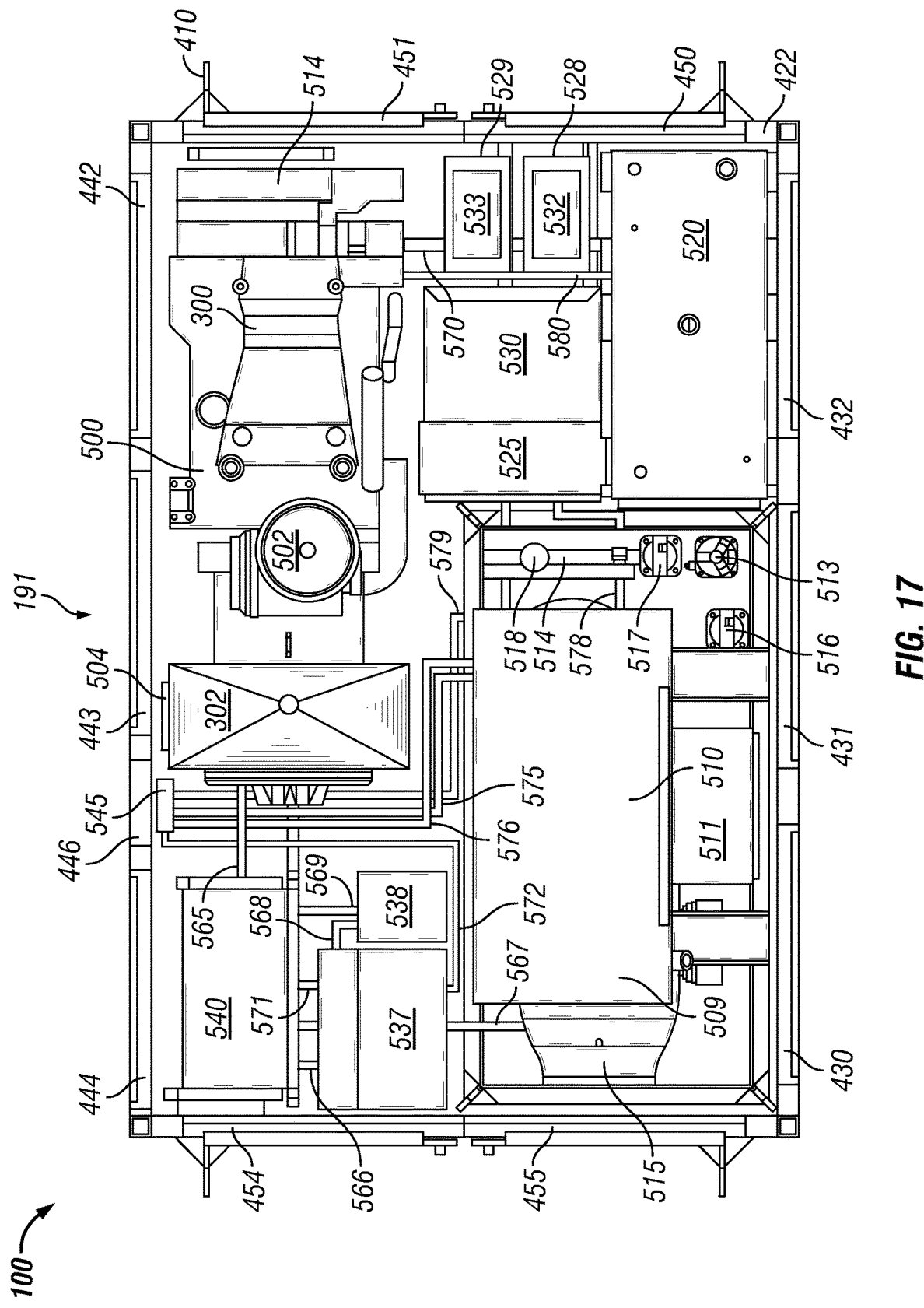
FIG. 17 is a top sectional view of an embodiment of the power system of FIG. 12.
Figure 18:
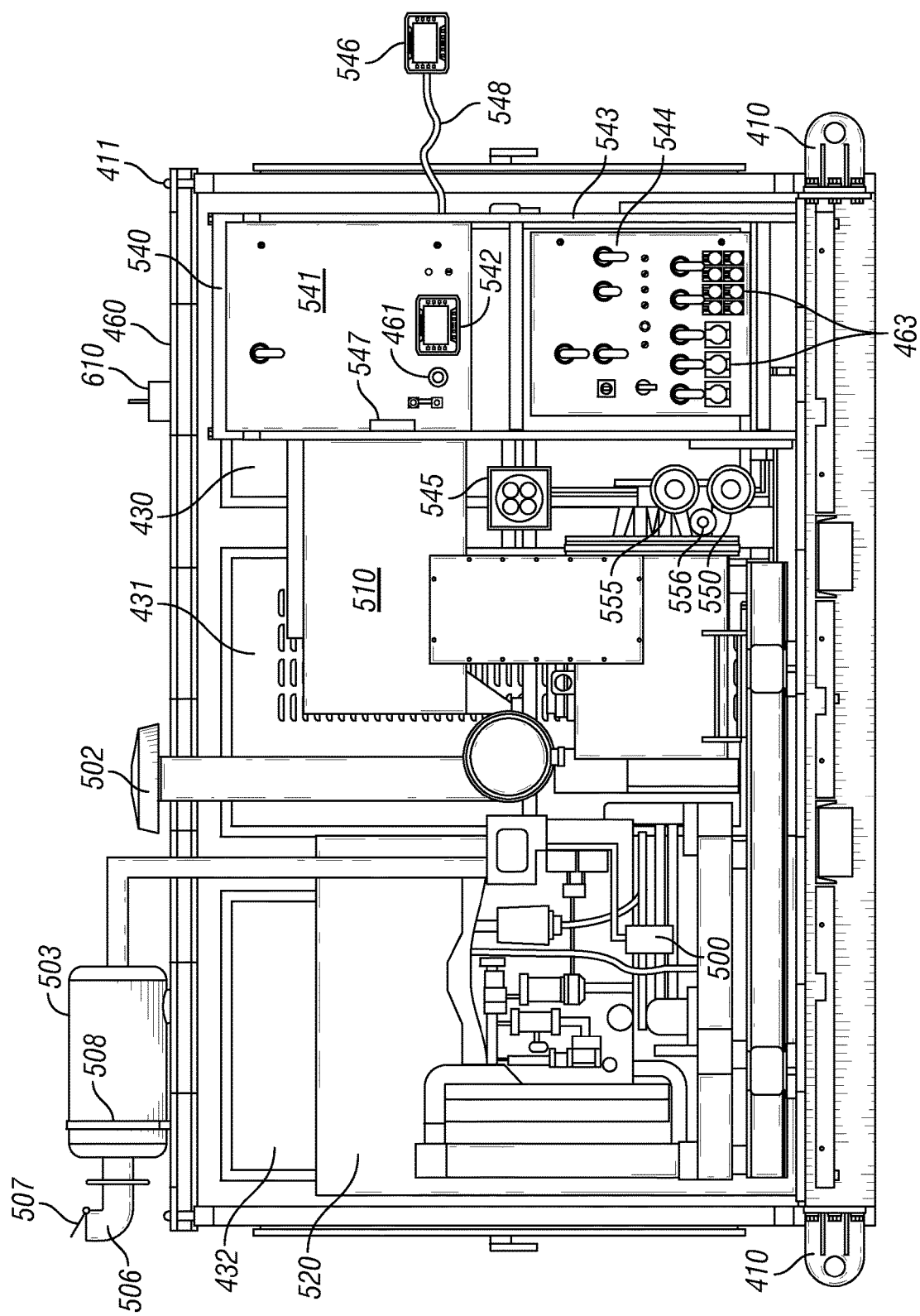
FIG. 18 is a back side sectional view of the power system of FIG. 12.

An exemplary layout of main operable components corresponding to the wall panel assembly 423 of FIG. 16 is seen in FIGS. 17 and 18. In this embodiment the power system 100 includes a primary power source 300, a hydraulic power supply system, an electric power supply system and a pneumatic power supply system supported upon a skid member 400, wherein the primary power source 300 is operationally configured as the exclusive source of power for the hydraulic power supply system, electric power supply system and the pneumatic power supply system. In this embodiment as shown, the power system 100 includes at least a primary power source 300 and electrical generator 302 provided as a generator set 500, a hydraulic power unit ("HPU") 509, a hydrocarbon fuel reservoir or fuel tank 520, diesel exhaust fluid ("DEF") tank 525, compressor 530, first and second battery boxes 528, 529 housing batteries 532, 533, a first transformer 537, a second transformer 538, a first cabinet 540 and a second cabinet 543 located below the first cabinet 540. The first cabinet 540 houses a master circuit breaker 541 of the power system 100 and a touch screen control panel 542 of the control circuitry of the power system 100 as well as a plug-in 547 for accessing primary power source 300 (or "engine 300") diagnostics. The second cabinet 543 houses a main circuit breaker control panel 544 in electrical communication with the control circuitry and an assembly of one or more electric outlets 463 of the control circuitry. As shown, the power system 100 may also include a remote touch screen control panel 546 apart from the power system 100. The remote touch screen control panel 546 may be tethered to the control circuitry of the power system 100 via electric cable 548 as known in the art or fiber optic cable or communicated with the control circuitry via a wireless connection. The electric cable 548 may extend any desired distance apart from the power system 100. In fracturing operations, an electric cable 548 may include a length as desired. For well site or fracturing operations one suitable electric cable 548 may include a length up to about 91.4 meters (about 300.0 feet). Likewise, wireless communication of the remote touch screen control panel 546 may extend a distance up to about 3.22 km (2.0 miles).

Figure 19:
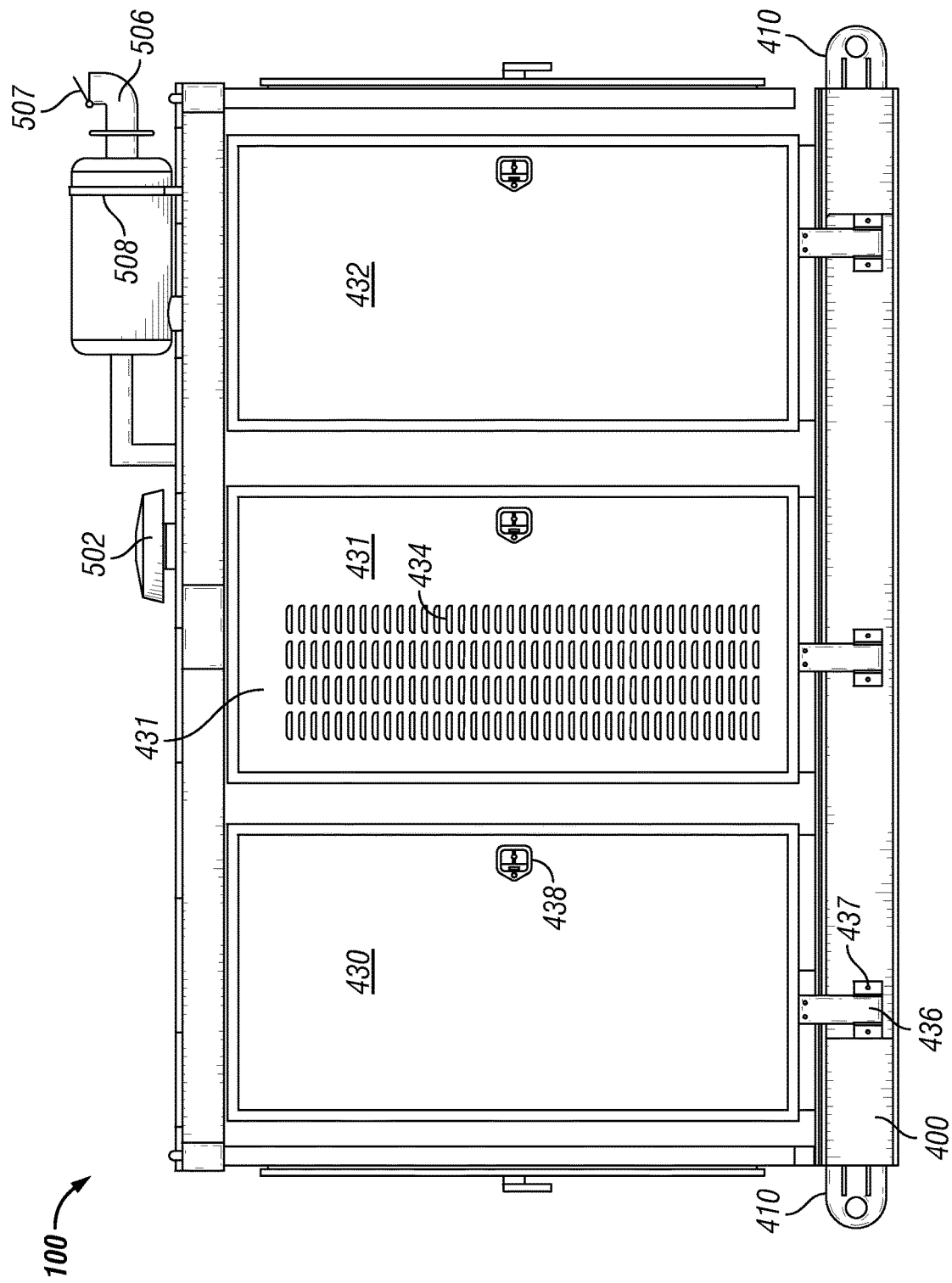
FIG. 19 is a front side view of the power system of FIG. 12.

An illustration of a completed front side 190 of the wall panel assembly 423 of FIG. 16 is illustrated in FIG. 19. In this embodiment, the front side 190 of the wall panel assembly 423 includes three similarly sized rectangular open sections 426 fitted with hinged doors 430, 431, 432. Herein, these open sections 426 may be referred to as "doorways." Even though the doorways may vary in size and shape, commonality of the doorways simplifies the design by requiring use of a single sized hinged style door.

As stated above, each of the hinged doors 430, 431, 432 may provide access to one or more internal operable components of the power system 100. In this embodiment, the first hinged door 430 provides access to HPU 509 including a hydraulic reservoir 510, a hydraulic system gauge display panel 511 and hydraulic reservoir sight glass 512. The second hinged door 431 provides access to a HPU main hydraulic fluid filter 513, radiator or "hydraulic oil cooler 514," a return hydraulic fluid filter 516, a kidney loop filter 517 and an air receiver tank 518. The main hydraulic fluid filter 513 suitably filters hydraulic fluid from the hydraulic reservoir 510 in order to minimize the presence of contaminants in downstream equipment. The return hydraulic fluid filter 516 suitably filters out any contaminants added to the hydraulic fluid from any downstream equipment prior to the hydraulic fluid re-entering the hydraulic reservoir 510. The kidney loop filter 517 suitably filters hydraulic fluid received from the hydraulic reservoir 510 prior to flowing through the hydraulic oil cooler 514 and re-entering the hydraulic reservoir 510 at a lower temperature for "cooling" or lowering the temperature of the hydraulic fluid housed in the hydraulic reservoir 510.

The third hinged door 432 provides access to the fuel tank 520. In this embodiment, the first hinged door 430 and the third hinged door 432 are provided as solid type doors and the second hinged door 431 is provided with an array of louvers 434 as shown. Suitably, the louvers 434 are operationally configured to aid in the flow of ambient air into and out from the power system 100 including air flow utilized by the hydraulic oil cooler 514. The actual door(s) fitted with louvers may vary in another embodiment.

Figure 20:
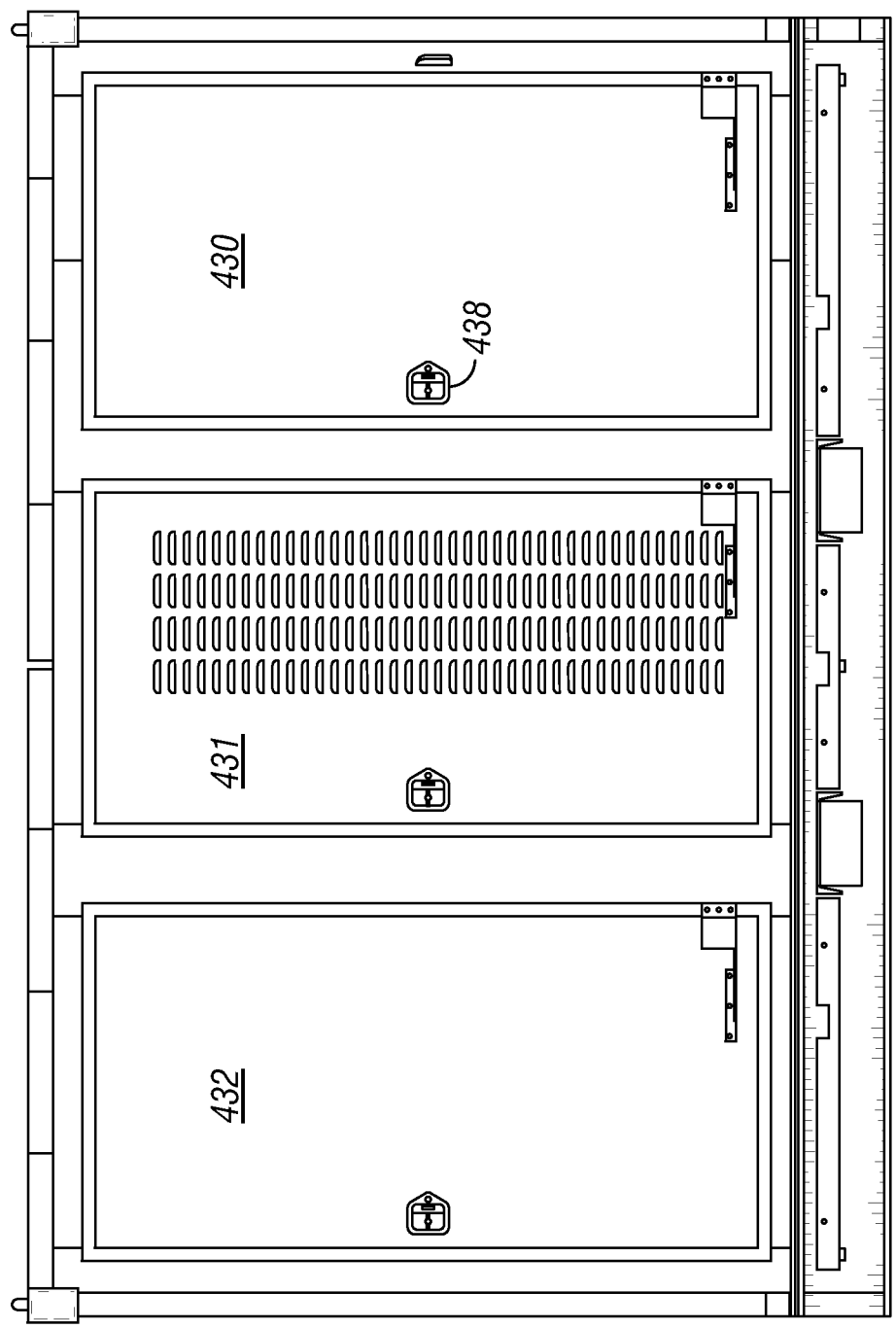
FIG. 20 is a view of the inner surface of the front side of FIG. 19.
Figure 27:
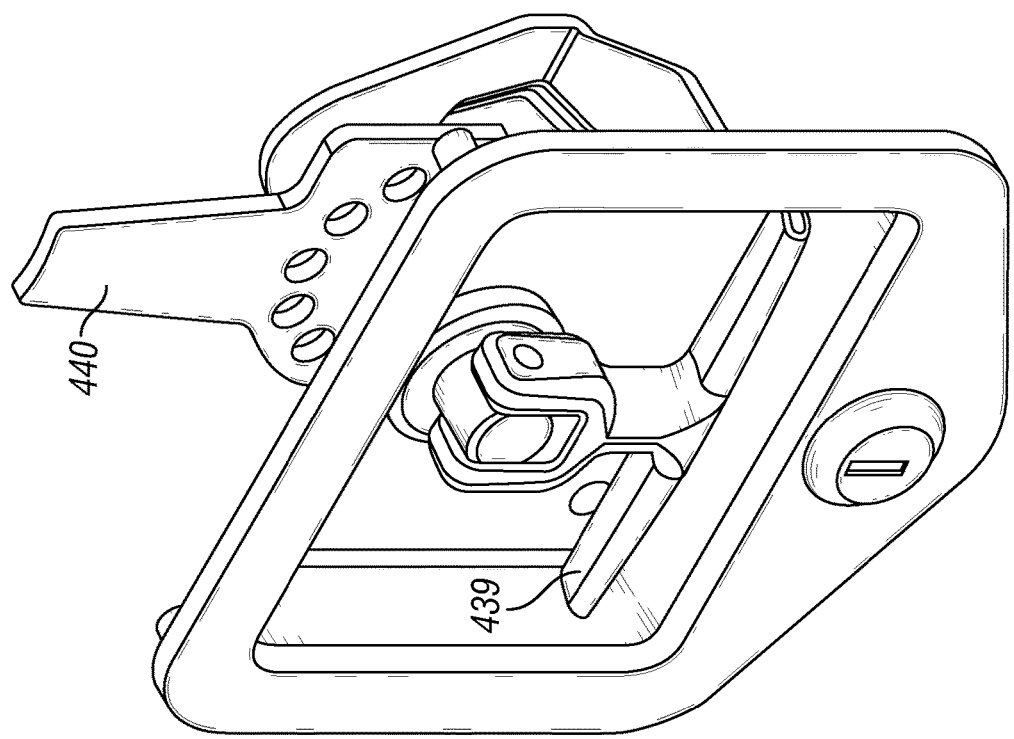
FIG. 27 is a perspective view of a door handle of the power system of FIG. 12.

FIG. 20 provides a view of the inner surface of the front side 190 of the wall panel assembly 423 of FIG. 18. The hinged doors 430, 431, 432 and/or the perimeter of the corresponding open sections 426 may include seals as desired. The hinged doors 430, 431, 432 may also be equipped with lockless or lockable door handles 438 preventing prohibited entry to the interior of the power system 100. Suitable lockable door handles 438 include keyed entry and/or keyless entry type door handles. In one embodiment, the wall panel assembly 423 may act as a door jamb for receiving a deadbolt therein. Suitable door handles 438 may include turnable knobs, turnable handles or a turnable fold out handle 439 and turnable catch 440 for contacting the inner surface of the wall panel assembly 423 when set to a locked position as shown in the embodiment of FIG. 27.

Figure 21:
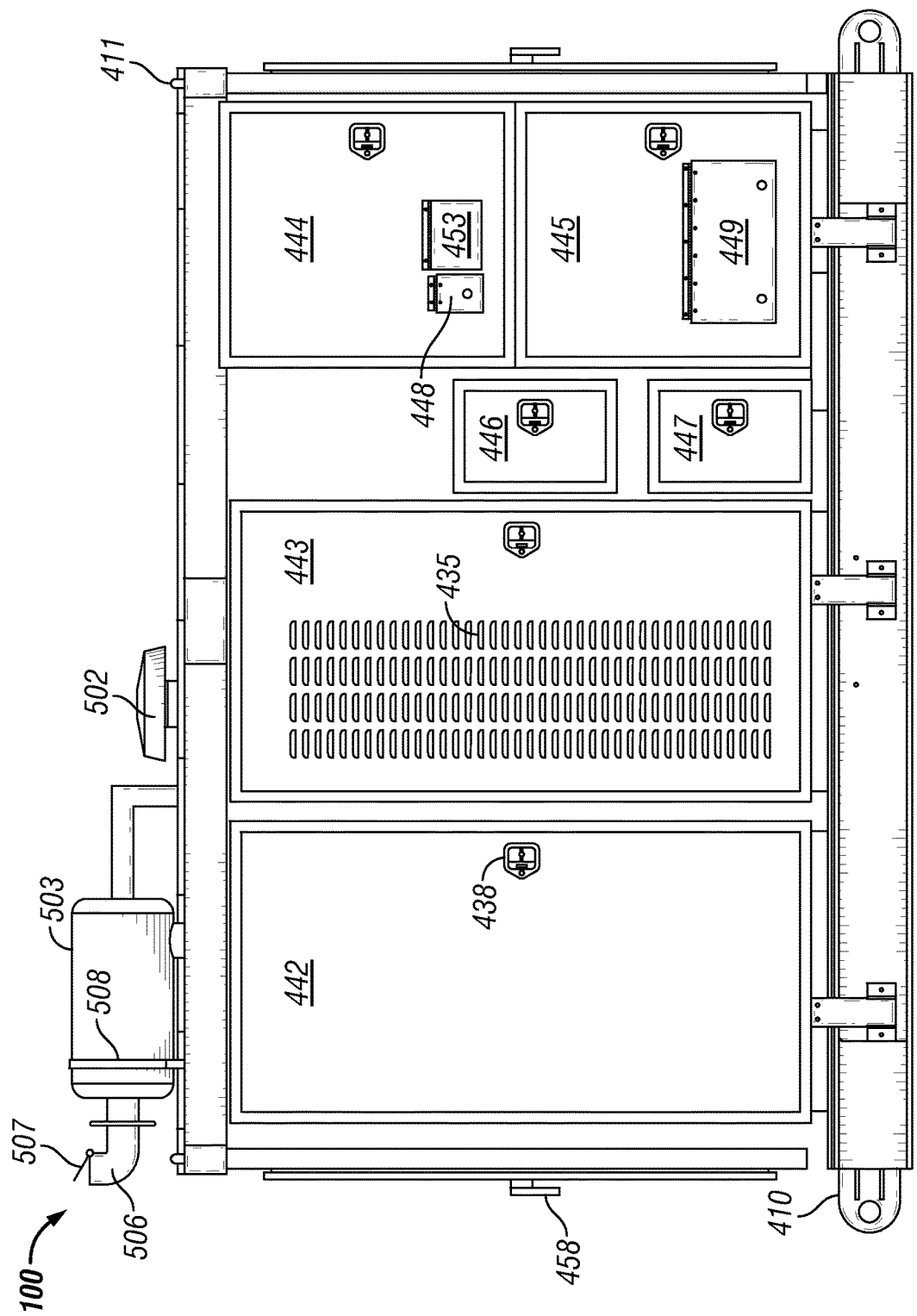
FIG. 21 is a back side view of the power system of FIG. 12.
Figure 22:
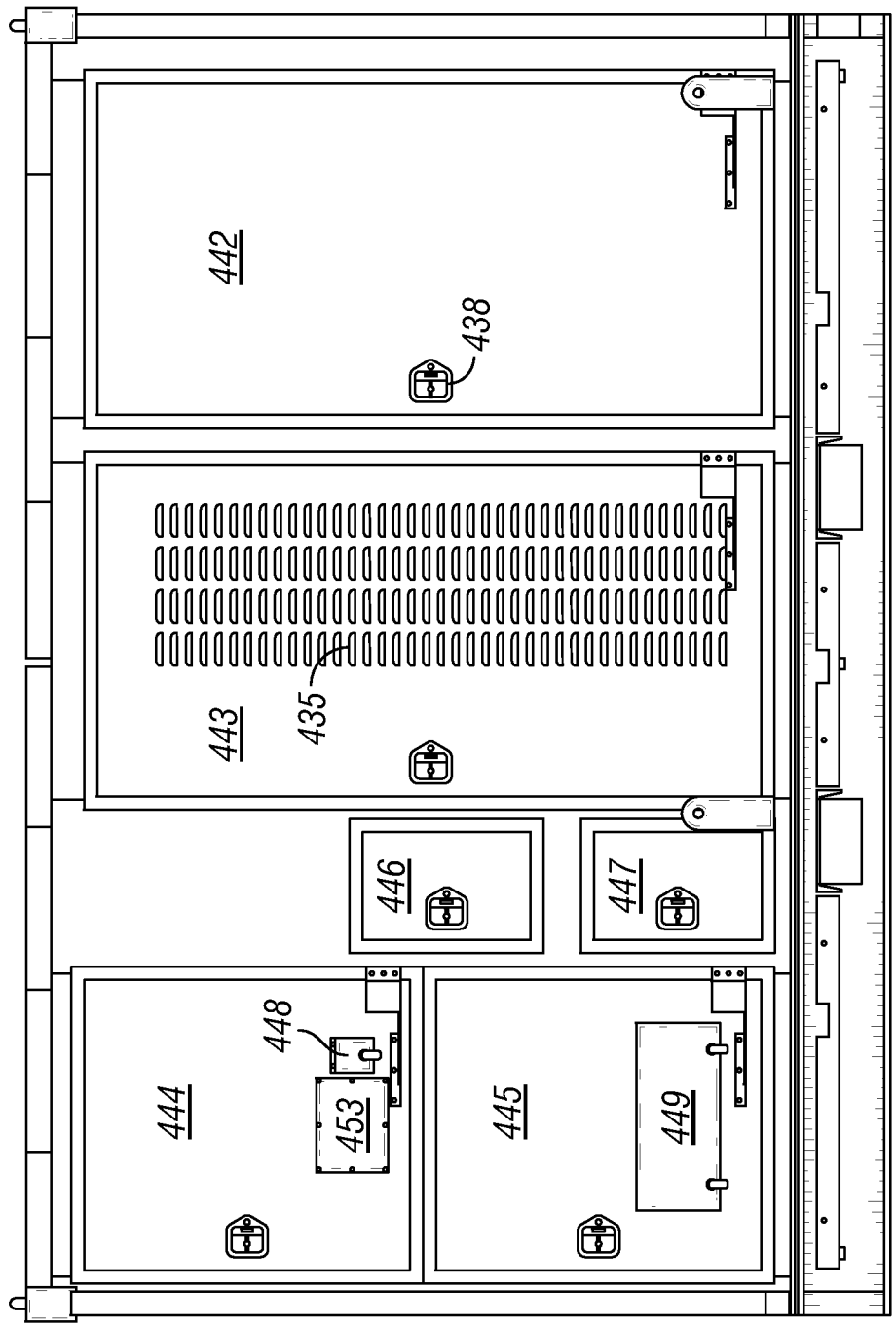
FIG. 22 is a view of the inner surface of the back side of FIG. 21.

A completed back side 191 of the wall panel assembly 423, the outer surface and the inner surface, are provided in FIGS. 21 and 22. In this embodiment, the back side 191 of the wall panel assembly 423 includes five open sections 426 including three doorways and two smaller open sections. As shown, the first doorway is fitted with a solid hinged door 442 and a second doorway is fitted with a hinged door 443 with louvers 435. A third doorway is fitted with two equally sized hinged doors 444 and 445 and the two smaller open sections are fitted with hinged covers 446, 447 as shown. In another embodiment, the hinged doors 444, 445 may be provided in unequal or differing sizes.

As shown, the hinged doors 442, 443, 444, 445 and hinged covers 446, 447 are each fitted with a similar door handle 438 and provide access to one or more operable components of the power system 100. In this embodiment, the fourth hinged door 442 provides access to the generator set 500, in particular the engine 300 and its fuel and oil filters provided as standard equipment of a generator set 500 as understood by the skilled artisan. The fifth hinged door 443 provides access to the generator set 500, in particular an electrical generator 302, an air intake 502 and a control module or control panel 504 of the primary power source 300. The louvers 435 disposed along fifth door 443 aid in the flow of ambient air into and out from the power system 100 including air flow for cooling the electrical generator 302. The sixth hinged door 444 provides access to the first cabinet 540. The seventh hinged door 445 provides access to the second cabinet 543. The first smaller hinged door 446 provides access to a first electric power transmission outlet or "power outlet 545" operationally configured to provide electricity for use by one or more heavy duty items or equipment including, but not necessarily limited to data vans 110, motor generator units, welders, pumps, compressors, light towers, cellular relay stations, and combinations thereof. As part of the electric power supply system, the power outlet 545 may vary in shape, size, type of connector, voltage and current rating, e.g., ranging from 20.0 amperes up to 400.0 amperes. One suitable power outlet 545 provides a dedicated 240.0 Volt, 60 Hz, 50.0 amperes circuit. One suitable power outlet 545 includes a pin and sleeve connector under the brand name Appleton® available from the Emerson Electric Company, Ferguson, Mo., U.S.A. A suitable power outlet 545 may also be flame proof as desired.

The second smaller hinged door 447 provides access to a hydraulic power transmission outlet or "hydraulic fluid outlet" or "fluid outlet 550," a hydraulic fluid inlet 555 providing for closed loop circulation of hydraulic fluid exiting out from the fluid outlet 550, and a pneumatic power transmission outlet or "compressed air outlet" or "air outlet 556" supplying pneumatic power (e.g., compressed air) to one or more pneumatic power tools 111 or operating as a general compressed air supply, e.g., for use as an air blower and/or for airing tires and other items. In another embodiment, the power system 100 may be provided with two or more hydraulic fluid outlets 550, two or more hydraulic fluid inlets 555 and two or more air outlets 556.

In this embodiment, the hydraulic fluid outlet 550 and inlet 555 are suitably operationally configured to fluidly communicate with various types of fluid conduits and/or fittings as known in the art, e.g., flange type direct connections and/or fitted with couplings and/or valves for providing multiple fluid lines. In one suitable embodiment, the outlet 550 and inlet 555 may each be fitted with a diverter valve or T or Y-shape shut-off valve type member, e.g., a stainless steel threaded Tee member shut-off valve operationally configured to provide multiple hydraulic fluid lines flow out from and back into the power system 100. One exemplary Y-shape member for use herein is provided as described in United States Patent Application Publication Number 20140311589, entitled "Multi-Port Connector for Fluid Assemblies," with a publication date of Oct. 23, 2014, the content of which is herein incorporated by reference in its entirety. Another exemplary valve includes a gate valve commercially available from W. W. Grainger, Inc., Lake Forest, Ill., U.S.A. Valves employed at outlet 550 and inlet 555 may also include actuators as known in the art. In addition, outlets 545, 550, 556 and inlet 555 may be fixed at one or more heights above the skid member 400 via a framework or one or more interior framing members using one or more brackets, clamps, tie-wraps, threaded fasteners, and combinations thereof as understood by persons of ordinary skill in the art. The outlets 545, 550, 556 and inlet 555 may also be fixed to the wall panel frame 420, e.g., fixed to part of the wall panel assembly 423.

As shown, door 444 is provided with two secondary doors 448, 453 thereon. The first door 448 provides access to an emergency stop 461 such as a push bottom or pull switch of main breaker 541. The second door 453 provides access to the touch screen control panel 542. Likewise, door 445 is provided with a smaller door 449 operationally configured to provide access to one or more electric outlets 463 for powering electrical equipment such as power system 100 lights and external lights, heater units, mechanical fans, power tools, a data van, and other items requiring electric power such as computers, smartphones, notepads, and the like. Even though doors 448, 453 and 449 are shown as being hinged to their respective doors 444, 445 along their upper sides, in another embodiment, one or more of the doors 448, 453 and 449 the right side, left side or bottom side may be hinged to either door 444 or 445.

Figure 23:
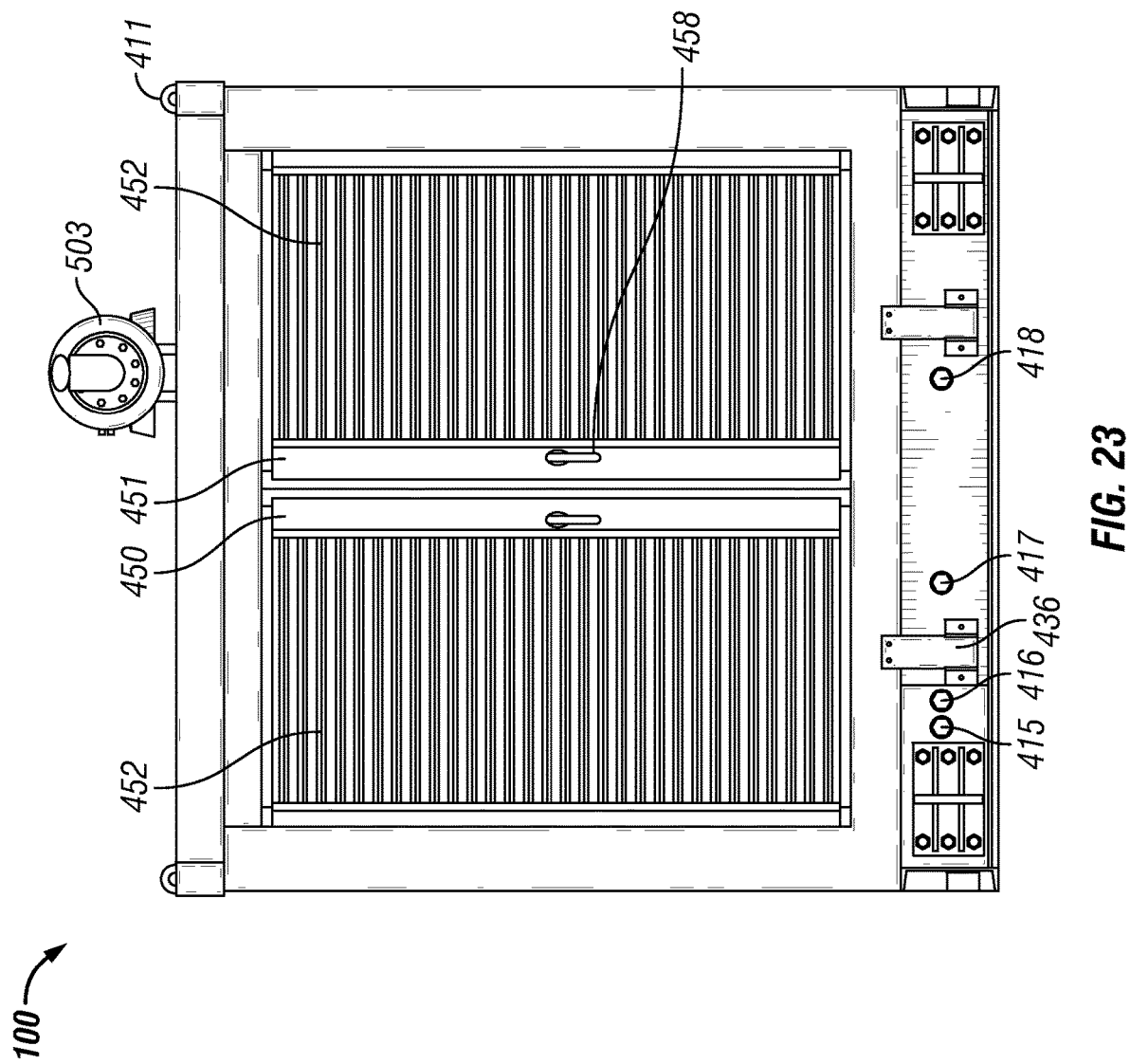
FIG. 23 is a right side view of the power system of FIG. 12.
Figure 24:
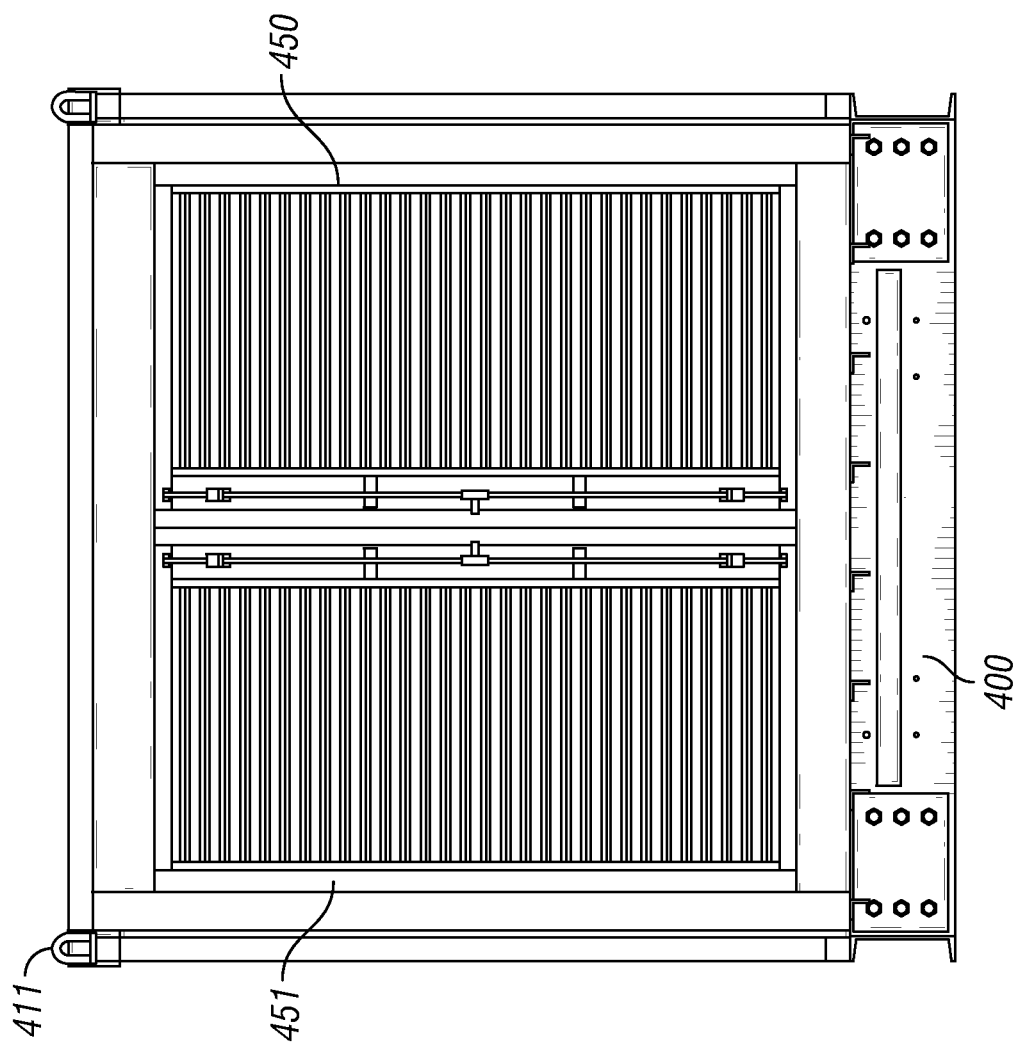
FIG. 24 is a view of the inner surface of the right side of FIG. 23.
Figure 25:
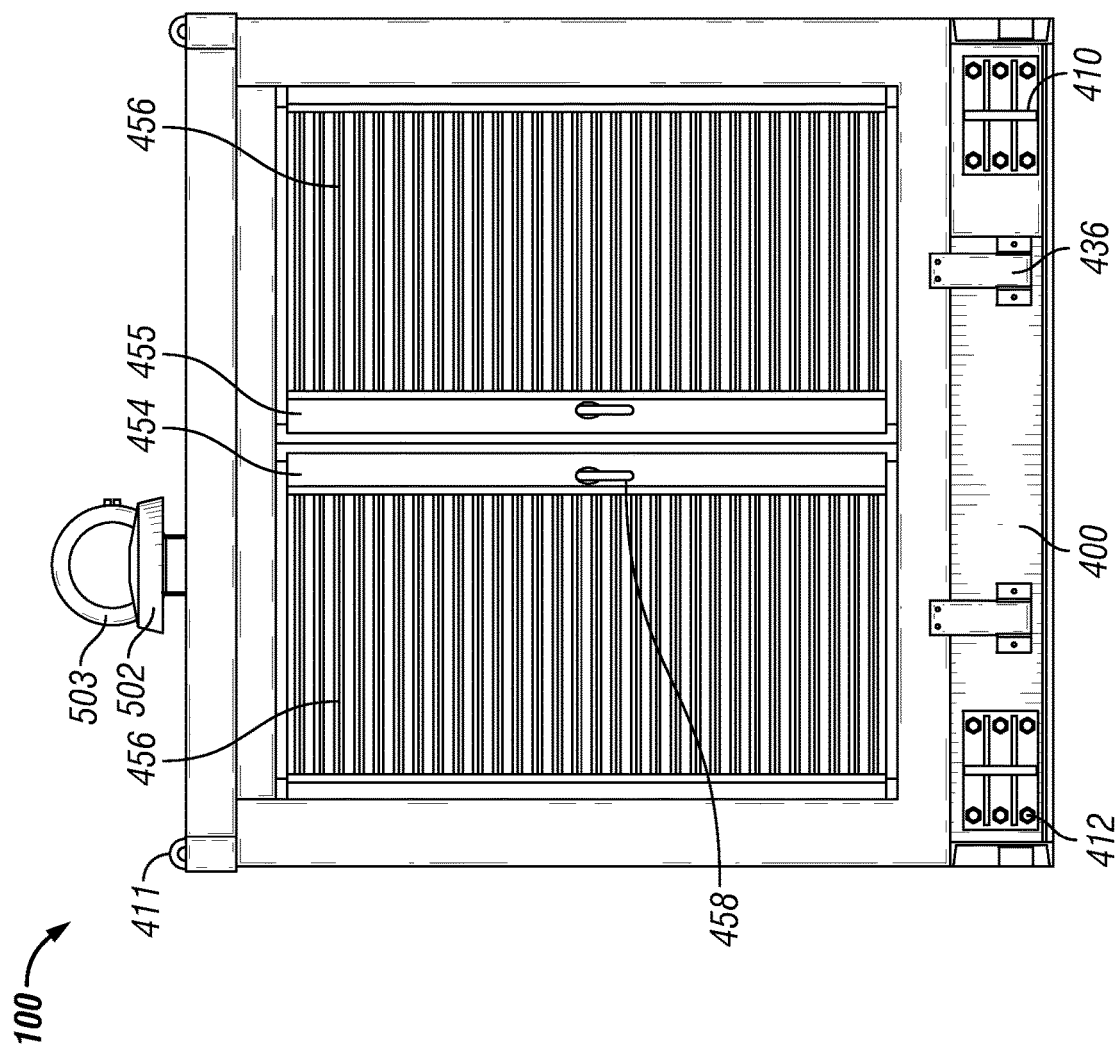
FIG. 25 is a left side view of the power system of FIG. 12.
Figure 26:
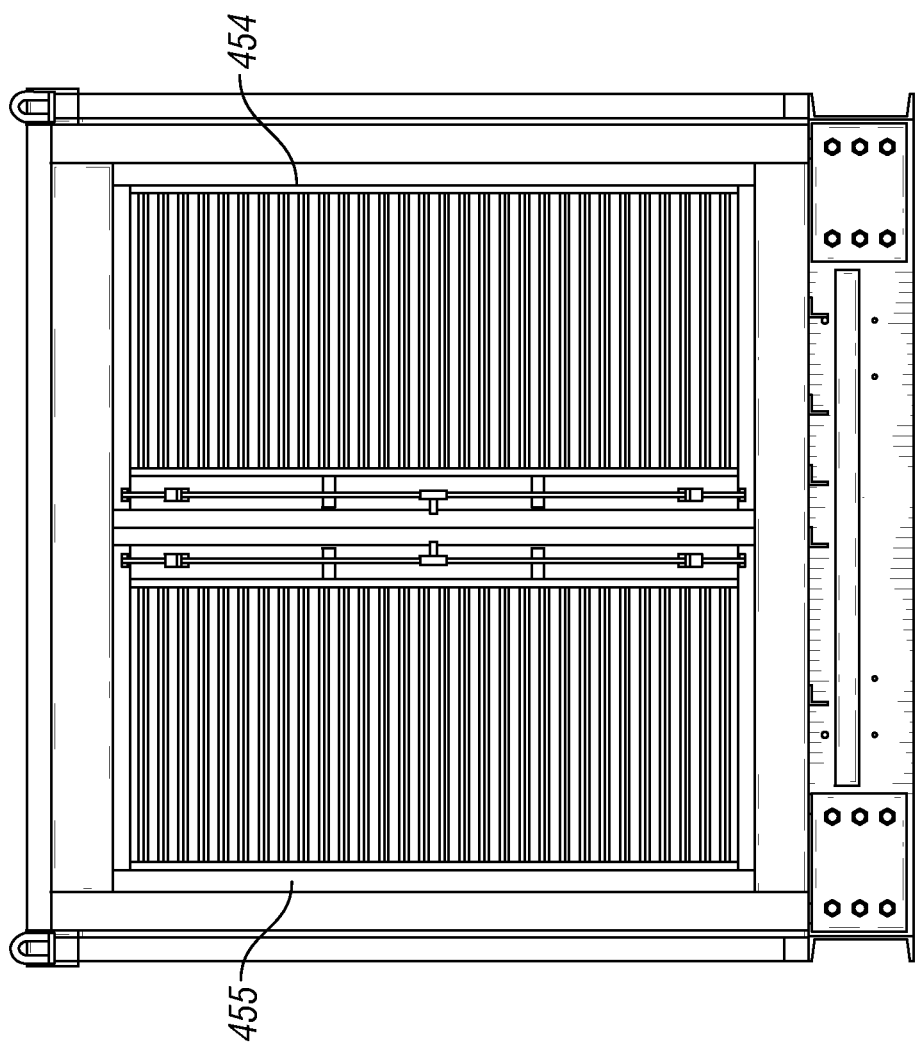
FIG. 26 is a view of the inner surface of the left side of FIG. 25.

A completed right side 192 of the wall panel assembly 423, the outer surface and the inner surface, are provided in FIGS. 23 and 24. As shown, the opening 427 (FIG. 16) is provided with main access hinged swing open double doors 450, 451 providing access to the radiator 514 of the primary power source 300, compressor 530, batteries 532, 533, DEF tank 525, an air/water separator and air lubricator located under the first and second battery boxes 528, 529, and access for filling the fuel tank 520. The air/water separator and air lubricator are fluidly communicated with the compressor 530 on an upstream side and fluidly communicated with air outlet 556 on a downstream side. As understood by the skilled artisan, the DEF tank 525, injects diesel exhaust fluid into the engine exhaust 503 where it vaporizing and decomposes to form ammonia and carbon dioxide to assist in converting the exhaust to harmless products such as nitrogen and water.

As shown in FIGS. 23 and 24, the doors 450, 451 may be provided with louvers 452 operationally configured to aid in the flow of ambient air into and out from the power system 100 including sufficient air flow into the enclosure for cooling and/or maintaining the internal ambient temperature at an acceptable upper limit during operation. A completed left side 193 of the wall panel assembly 423 is provided in FIGS. 25 and 26. The opening 428 (FIG. 16) is provided with main access hinged swing open double doors 454, 455 providing access to the electrical motor 515 of the HPU 509 and the transformers 537, 538. As shown, the doors 450, 451 may be provided with louvers 456 operationally configured to aid in the flow of ambient air into and out from the power system 100 including sufficient air flow into the enclosure for cooling and/or maintaining the internal ambient temperature at an acceptable upper limit during operation of the power system 100. Without limiting the invention, the double doors 450, 451, 454, 455 may include turnable lockable door handles as known for use with double swing open double doors, including, but not necessarily limited to turnable lockable handles 458 as shown.

The power system 100 may include a multi-panel or single-panel roof 460 securable to the upper portion 422 of the wall panel frame 420 in a manner effective to cover the top of the wall panel frame 420 providing a removable enclosure for the operable components of the power system 100 housed therein. Suitably, the roof 460 includes one or more apertures or cut-out sections in fluid communication with the ambient environment. In particular, the one or more apertures or cut-out sections are operationally configured to receive part of the engine air intake 502 and engine exhaust 503 there through. As seen in FIG. 18, the engine exhaust 503 may include an upward facing outlet member 506 with an exhaust rain cap 507 hingedly attached thereto. A clamp 508 may also be employed for securing the engine exhaust 503 to the roof 460. The roof 460 may also include vents and the like to aid in the flow of ambient air into and out from the power system 100. Vents may also include open/shut covers to prevent rain and other foreign materials from entering the power system 100. In another embodiment, the roof 460 may be provided as a sloped roof from about 1.0 degree up to about 10.0 degrees effective for water such as rain and melting snow to easily run off the roof 460 eliminating the possibility of standing water collected atop the roof 460. As such, the upper portion 422 of the wall panel frame 420 may be operationally configured to accommodate a sloped roof, i.e., upper portion 422 having a multi-level height. In another embodiment, the roof 460 may include a first end higher than a second end for providing an upper sloped surface there between.

Figure 28:
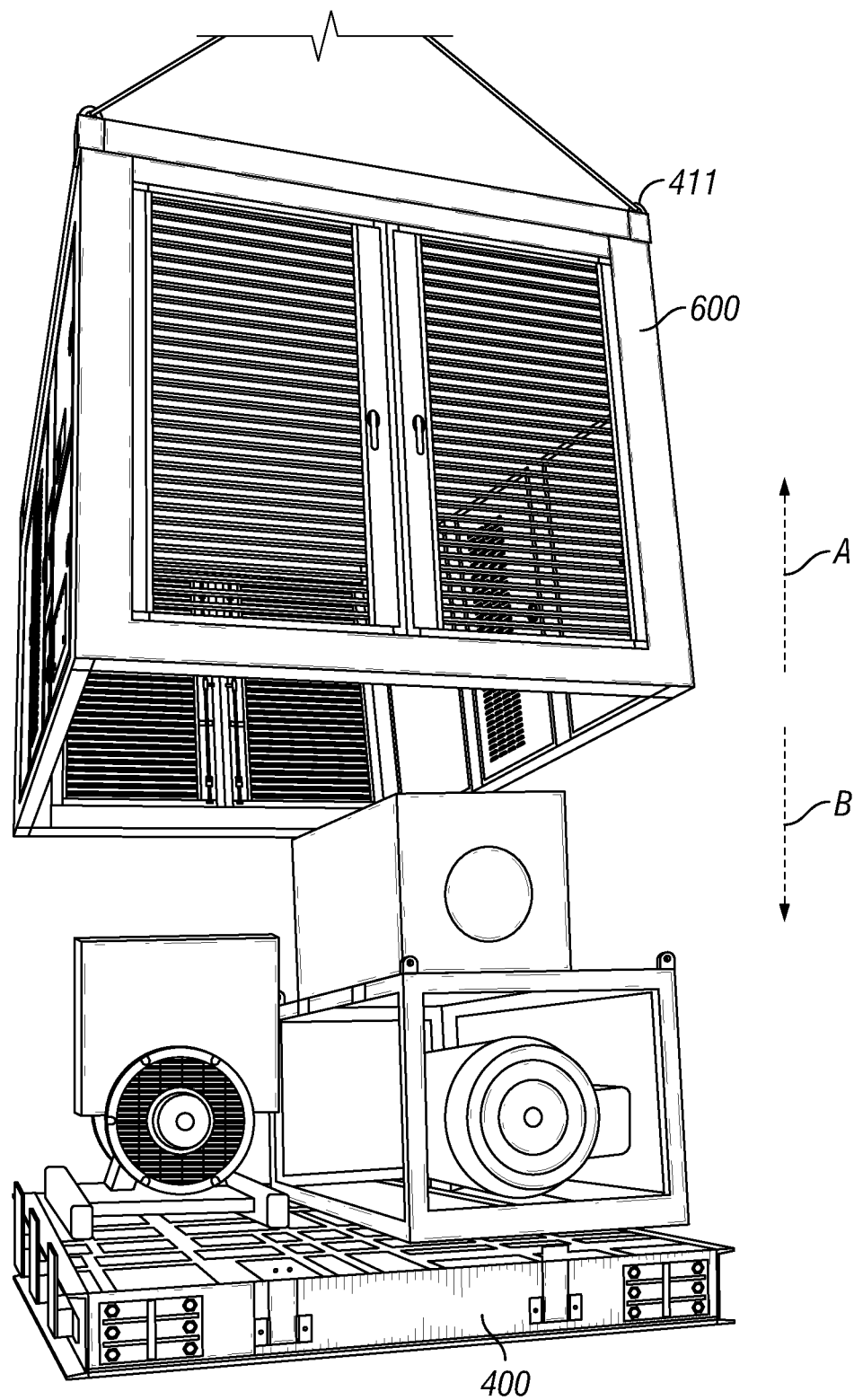
FIG. 28 is an illustration of a removable enclosure being installed onto a skid member of a power system of this application.

As shown in FIG. 28, the removable enclosure 600, i.e., the wall panel frame 420, wall panel assembly 423 and roof 460 may be provided as one piece construction or otherwise assembled together prior to being secured to the skid member 400 supporting at least some operable components thereon whereby other operable components may be installed after the removable enclosure is secured to the skid member 400. In such embodiment, the power system 100 may include one or more upper lift eyes 411 secured to the upper portion 422 of the wall panel frame 420 at or near the corners for maintaining the power system 100 in a substantially level orientation as the removable enclosure is being transported on and/or off a skid member 400 (see Directional Arrows A and B). In another embodiment, the upper lift eyes 411 may be secured to the wall panel assembly 423. In another embodiment, the upper lift eyes 411 may also be used for transporting and/or lifting the complete power system 100 including the skid member 400.

In an embodiment purposed for fracturing operations, a power system 100 may include an enclosure including a wall panel assembly 423 and roof 460 constructed from plastic, fiber reinforced plastic, stainless steel, mild steel, galvanized steel, and combinations thereof with or without a corrosion resistant powder-coated paint finish. Likewise, the various doors of the front side 190 and back side 191 of the wall panel assembly 423 may be constructed from plastic, fiber reinforced plastic, stainless steel, mild steel, galvanized steel, and combinations thereof with or without a corrosion resistant powder-coated paint finish. It is also contemplated that the outer surface of the wall panel frame 420 and/or wall panel assembly 423 may include protective guard members operationally configured to protect against handling damage of the outer surface of the power system 100, e.g., rubber guard members placed along the outer corners of the power system 100.

In an embodiment purposed for fracturing operations, a power system 100 as described with reference to FIGS. 12-31 may be provided with the following dimensions as listed in Table 2 below.

TABLE 2

|  | Meters | Feet |
| --- | --- | --- |
| Power System 100 Height: | about 2.51 | about 8.255 |
| Power System 100 Length: | about 3.91 | about 12.84 |
| Power System 100 Width: | about 2.57 | about 8.42 |
| Skid Member 400 Height: | about 0.3 | about 1.0 |
| Hinged Covers 446, 447 Width: | about 0.31 | about 1.02 |
| Hinged Doors 430, 431, 432 Height: | about 1.97 | about 6.46 |

Figure 29:
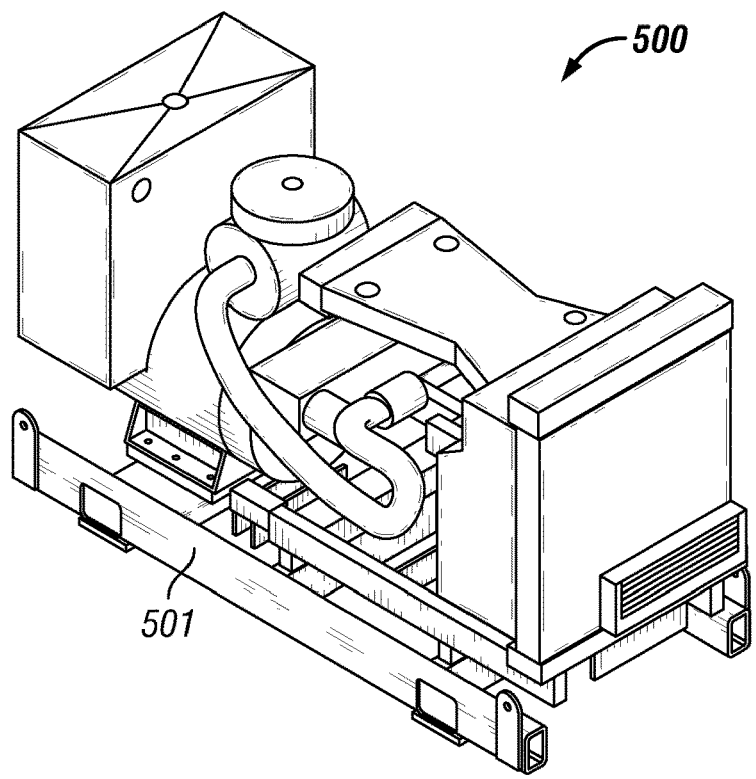
FIG. 29 is a perspective view of an exemplary generator set for use as part of a power system of this application.
Figure 30:
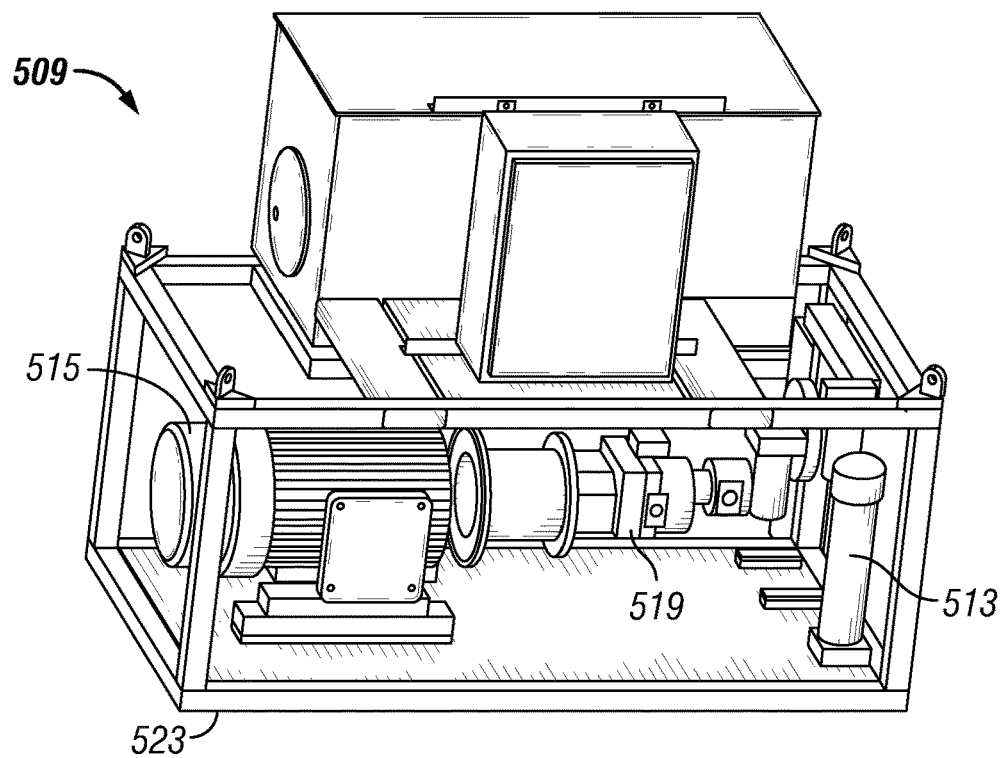
FIG. 30 is a perspective view of an exemplary hydraulic power unit for use as part of a power system of this application.

Turning to FIGS. 29 and 30, a suitable generator set 500 for use herein may be provided as a standalone modular unit including a modular framework including, but not necessarily limited to a skid member 501 constructed from steel tubing, i.e., square tubing or box tubing, as known the art of generator sets securable to the skid member 400 via fasteners such as clamps and/or nut/bolt type fasteners as described above. Likewise, the HPU 509 may be provided as a standalone modular unit including a modular framework including, but not necessarily limited to a skid member 523 securable to the skid member 400 via fasteners such as nut/bolt type fasteners as described above. In one suitable embodiment, the HPU 509 (1) is operationally configured to start up to four frac pumps 105 remotely simultaneously using a start button or the like, (2) includes adjustable circuits to provide primary or back-up hydraulic power to run sand-handling equipment (e.g., sand kings, t-belts), (3) employs SMART technology for monitoring HPU 509 performance and oil conditions.

In addition, the transformers of the power system 100 (e.g., a first transformer 537, a second transformer 538) may also be provided on a modular framework securable to the skid member 400. Likewise, the first cabinet 540, second cabinet 543 and their contents (e.g., master circuit breaker 541 and main circuit breaker control panel 544) may also be provided on a modular framework securable to a framework of the power system 100. Such modularity of the various operable components suitably decreases total manufacturing time allowing the power system 100 to be easily assembled. In addition, modularity improves the maintainability of the various operable components of the power system 100. Moreover, the modularity of the various operable components is effective for the power system 100 to include the operable components in a plurality of layouts on a single platform or on multiple platforms at both temporary and permanent installations.

Figure 31:
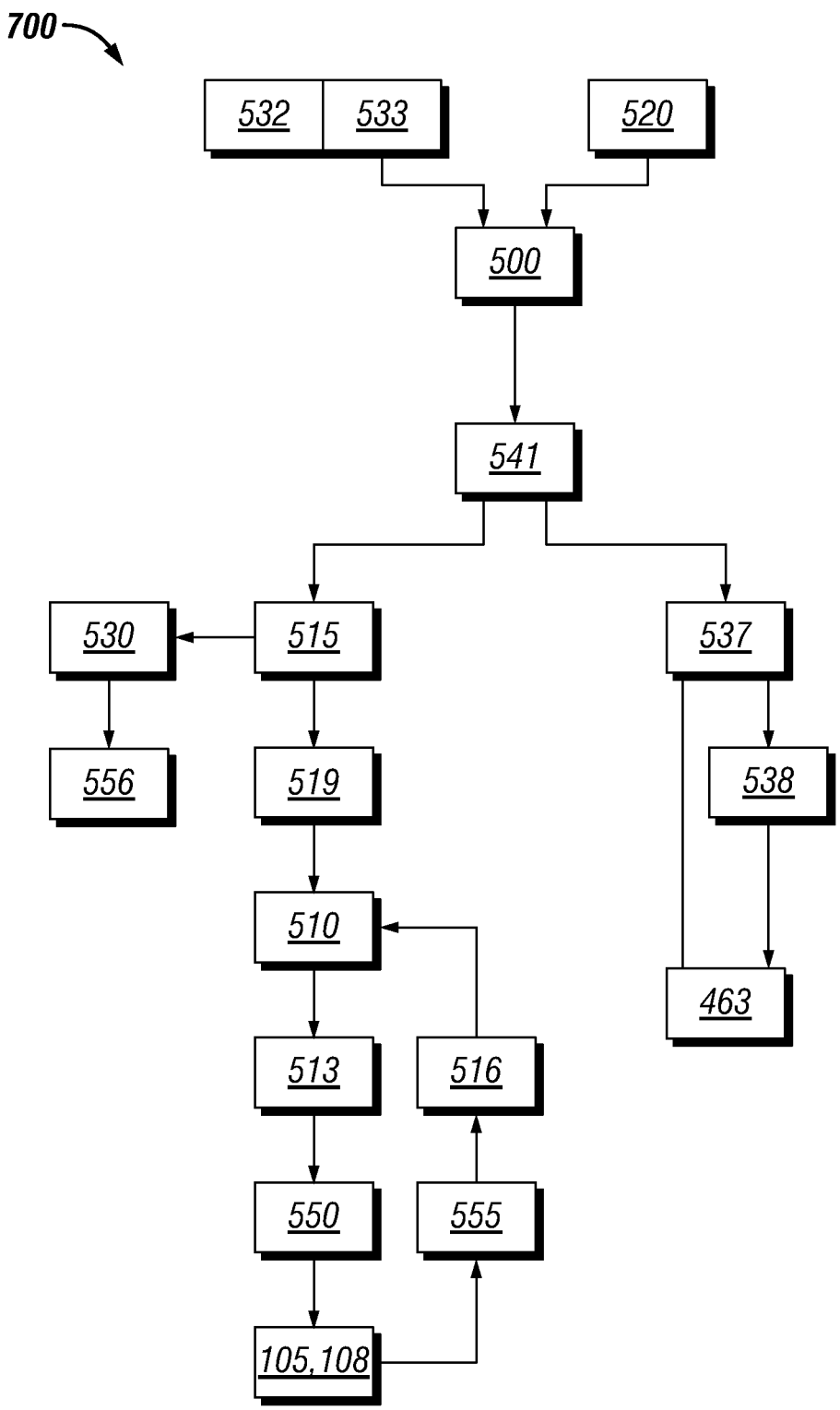
FIG. 31 is a simplified flowchart exemplifying operation of operable components of an embodiment of a power system of this application.

With reference to the flowchart 700 of FIG. 31, the power system 100 of this application is operationally configured to provide hydraulic power, electric power and pneumatic power simultaneously, all of which is driven exclusively by a single power source such as a single generator set 500, beginning with operation of the engine 300. In particular, fuel stored in the fuel tank 520 is fluidly communicated to the engine 300 of the generator set 500 via line 580 for compression-ignition or spark-ignition depending on the type of engine 300 and fuel employed. Likewise, the batteries 532, 533 supply electric current to the engine 300 via line 570 to start the engine 300 as understood in the art. Although the power system 100 may be built to scale, a power system 100 as shown in FIGS. 17 and 18 operationally configured for fracturing operations may employ a generator set 500 such as the Caterpillar® C7.1 diesel generator, 200.0 ekW, 60.0 Hz, 1800.0 rpm 480.0 Volts or equivalent. Another exemplary generator set 500 may include model number QSB7 commercially available from Cummins Power Systems, Minneapolis, Minn., U.S.A. As understood by the skilled artisan, a generator set 500 for use herein may be equipped with (1) an air inlet system, (2) a control system, (3) a cooling system, (4) an exhaust system, (5) flywheels and a flywheel housing, (6) a fuel system, (7) at least one generator and related attachments, (8) a lube system, (9) a mounting system, (10) one or more power take-offs and a crankshaft pulley, (11) a torsional vibration damper and guard, (12) lift eyes, (13) a battery switch disconnect, (14) an exhaust temperature sensor, (15) flexible fuel lines, (16) a dipstick, (17) a coolant recovery tank and (18) a jacket water heater.

In regard to the an electric power supply system, an exemplary generator set 500 may be effective for supplying 480.0 Volts of electric current to the master circuit breaker 541 via line 565. The first and second transformers 537, 538 of the electric power supply system are suitably effective to transform line voltage to one or more voltages suitable for powering equipment and other devices external the power assembly 100. For example, in this embodiment the first transformer 537 receives 480.0 Volts of electric current from the master circuit breaker 541 via line 566 and transforms or steps down the voltage from 480.0 Volts to 240.0 Volts. The second transformer 538 receives 240.0 Volts of electric current from the first transformer 537 via line 568 and steps down the voltage from 240.0 Volts to 120.0 Volts. In another embodiment, the power system 100 may be provided with a single transformer. In yet another embodiment, three or more transformers may be employed as part of the power system 100.

In this embodiment, the power outlet 545 may make use of the 240.0 Volts supply of the first transformer 537 via line 572. In addition, a second electric power transmission outlet provided as one or more electric outlets 463 may make use of the 240.0 Volt supply of the first transformer 537 via line 571 and one or more other electric outlets 463 may make use of the 120.0 Volts supply of the second transformer 538 via line 569. In other words, one or more electric outlets 463 may include one or more 120.0 Volt outlets, one or more 240.0 Volt outlets, and combinations thereof. In one embodiment, the electric outlets 463 may comprise two 240.0 Volt outlets and eight 120.0 Volt outlets. It is also contemplated that one or more 480.0 Volt outlets be provided making use of the 480.0 Volt directly from the master circuit breaker 541. As such, in another embodiment, the power system 100 may include one or more electric outlets including one or more 120.0 Volt outlets, one or more 240.0 Volt outlets, one or more 480.0 Volt outlets, and combinations thereof.

In regard to the hydraulic power supply system, the electrical motor 515 receives 480.0 Volts of electric current from the master circuit breaker 541 via line 567 for powering the electrical motor 515, which in turn powers the hydraulic pump 519 for pumping hydraulic fluid out from the hydraulic reservoir 510 through a main hydraulic fluid filter 513 and out through the hydraulic fluid outlet 550 via line 575 to a downstream destination such as one or more frac pumps 105 and/or one or more hydraulic power tools 108 at a desired rate, e.g., up to about 24.13 MPa at 4.73 L/s (about 3500.0 psi at 75.0 gallons per minute). The hydraulic fluid is returned from one or more frac pumps 105 and/or one or more hydraulic power tools 108 in a closed loop configuration and enters the power system 100 through a hydraulic fluid inlet 555 into line 576 and through the hydraulic fluid filter 516 before returning to the hydraulic reservoir 510.

In regard to the pneumatic power supply system, the electrical motor 515 further powers the compressor 530 via a hydraulic line 578 by providing pressurized hydraulic fluid to drive the compressor 530. In another embodiment, the hydraulic pump 519 may comprise two pumps in series, a main pump as described above and a smaller pump. In such embodiment, the smaller pump is operationally configured to power the compressor 530 via a hydraulic line 578 by providing pressurized hydraulic fluid to drive the compressor 530. Once powered, the compressor 530 is operationally configured to convey compressed air, for example, at 1.05 cmm at 0.69 MPa (about 37.0 cfm at 100.0 psi) to the air outlet 556 via line 579. In an embodiment of the power system 100 suitable for fracturing operations, the maximum pressure is about 1.03 MPa (about 150.0 psi). Each of the fluid lines and electrical lines may include one or more outer insulated materials and/or one or more outer protective covers such as spiral protective wrapping known in the art.

The compressor 530 of the power system 100 eliminates the need for truck carried compressors typically provided for pneumatic power tools on work sites.

The power system 100 may also be provided with a full data telemetry system or telemetry package 610, e.g., a bolt on unit mounted on the roof 460, operationally configured to read all data of the power system 100 via wireless network, cellular network, satellite network, and combinations thereof. In particular, a suitable telemetry package 610 provides (1) remote monitoring of one or more power system 100 parameters, (2) system upgrades of the power system 100 including software updates that may be performed remotely and (3) data including, but not necessarily limited to tracking of the location, performance and operational status of the power system 100. If a user of the power system 100 is at a location out of range for remote operation, the telemetry package 610 is operationally configured to save or store data for retrieval at a later time.

The power system 100 may also be provided with one or more sensors for monitoring various operating conditions of the power system 100. For example, the power system 100 may include up to four hundred (400) or more sensors, e.g., the HPU 509 may be provided with up to twenty-two (22) sensors for monitoring the operating status of the HPU 509 and the engine 300 may be provided with over three hundred (300) standard sensors from the manufacturer for monitoring engine 300 performance—all of which may be communicated to the control circuitry of the power system 100, which in turn is in electric communication with one or more control centers. For example, sensor readings may be viewed via the touch screen control panel 542 or elsewhere, e.g., via monitors in a data van 110. For example, one or more remote meters may be installed at one or more locations around the well site, e.g., inside a data van 110, to monitor and record engine 300 hours, HPU 509 hours, engine 300 temperatures, engine 300 pressures, engine 300 rpm, and other engine 300 parameters, and send the information to end user maintenance management software or the like. Hydraulic pump pressure and pump rate may be monitored, recorded and sent to any computer or the like as desired or otherwise programmed. A data van 110 or other control center may be operationally configured to remotely start and stop the power system 100 and/or each frac pump 105 from a remote location (e.g., a control center for the power system 100) in addition to starting and stopping each frac pump 105 locally. During fracturing operations, personnel may provide real-time data to customers or other parties of interest. Once a fracturing operation is stopped or otherwise completed, personnel may produce detailed reports regarding the operation and an accounting for each item or component making up the total cost of the operation.

In view of the above discussion, a process for extracting oil and gas by hydraulic fracturing represents another aspect of the present invention. In one implementation, an entity such as an operations vendor, i.e., a fracturing operations company and its personnel, enter an intended well site and rig up a frac spread utilizing the present system equipment including the power system 100. Although not limited as to location and/or orientation, a power system 100 may be placed in an easily accessible area near a bank of frac pumps 105 and a data van 110, e.g., within about 2.0 meters of the nearest frac pump 105 and within about 5.0 meters of a data van 110. Depending on the size of the well site and the layout of specific equipment and the quantities of equipment needed to be powered, a second power system 101 may be employed as part of the frac spread as shown in FIG. 4. For example, a well site including multiple banks of frac pumps 105, 106 may each include a power system 100 and 101 dedicated for use with a particular bank of frac pumps 105 or 106.

Once the power system 100 is set in place at a desired location, preferably a substantially level surface, the power system 100 may he fluidly connected to the most proximal frac pump 105 via, a fluid conduit assembly 117 as described above. Subsequent frac pumps are suitably interconnected or "daisy chained" together with additional hydraulic line and isolation valves known in the art in a closed loop configuration with a return flow line 121 operationally configured to convey hydraulic fluid back to the hydraulic reservoir 510 of the power system 100. Suitable isolation valves include, but are not necessarily limited to high pressure two-way ball valves commercially available from Dalton Bearing & Hydraulic, LLC, Blaine, Tenn., U.S.A., e.g., see two-way ball valve item number 242-163-D.

In one mode of operation utilizing the power system 100 of FIG. 17, personnel initially start the engine 300, which then starts and runs the electrical generator 302 of the generator set 500. Each of the frac pumps 105 are suitably turned on in subsequent order starting with the frac pump 105 located nearest the power system 100. For example, once the power system 100 is operating, a first isolation valve 103 controlling the flow of hydraulic fluid from the power system 100 to the first frac pump 105, i.e., the frac pump 105 located nearest the power system 100, may be opened either manually or remotely allowing hydraulic fluid to flow to a hydraulic starter of the frac pump 105 for activating the frac pump 105, i.e., for activating the engine of the frac pump 105. Once the first frac pump 105 is started, the first isolation valve 103 may be shut off and the process repeated with each subsequent frac pump 105 until all the frac pumps in series are turned on and operational for pumping fracturing fluid into a well. The opening or closing of the isolation valves may be performed locally or remotely via electrical, hydraulic or pneumatic actuators. Because isolation valves can be set to any position between fully open and fully closed, valve positioners may be employed to ensure each valves attains the desired degree of opening. Air-actuated valves are commonly used because of their simplicity, as they only require a compressed air supply, whereas electrically-operated valves require additional cabling and a switch gear, hydraulically-actuated valves required high pressure supply and return lines for the hydraulic fluid.

The invention will be discussed with reference to the following non-limiting examples, which are illustrative only and not intended to limit the present invention to a particular embodiment.

EXAMPLE 1

In a first non-limiting example, a system as shown in FIG. 2 is provided as part of a frac spread. Each frac pump 105 includes a diesel-powered engine and hydraulic pump. Collectively, the frac pumps 105 provide sufficient pressure into a wellbore for the injection and movement of fracturing fluid, e.g., water, proppants, and chemical additives, up to several hundred meters of earth and rock. The power system 100 and frac pumps 105 are operationally configured to operate over a wide range of pressures and injection rates and can operate at about 100.0 MPa (15,000.0 psi) or higher and 265.0 L/s (100.0 barrels per minute) or higher. The power needed for hydraulic fracturing operations may exceed 20.0-30.0 megawatts.

The generator set 500 may be powered to supply (1) hydraulic fluid to the frac pumps 105, (2) electric power to one or more items of the frac spread, e.g., data van 110, one or more lighting towers 115 and (3) pneumatic power to one or more pneumatic power tools or items requiring compressed air. Electric power and/or pneumatic power may be made available before activation of any frac pumps 105, during fracturing downhole and after the frac pumps 105 are shut down.

The size of each frac pump 105 may depend on various factors such as the overall pumping requirements at the well site, e.g., in terms of pumping pressure and pumping rate. For typical fracturing operations in North America, each frac pump 105 may have the following performance specifications: (1) maximum pressure of about 137.9 MPa (about 20,000.0 psi), (2) minimum pump rate of about 321.9 liters per minute (about 2.7 bpm); (3) maximum pump rate of about 2253.6 liters per minute (about 18.9 bpm; and (4) hydraulic horsepower ranging from about 2000.0 hhp to about 3000.0 hhp, although this range can vary considerably.

EXAMPLE 2

In a second non-limiting example, a frac spread similar as shown in FIG. 1 is replaced by incorporating a frac spread comprising the system as shown in FIG. 4. The frac spread of FIG. 1 is a 50,000 hydraulic horsepower ("HHP") frac spread. Just over one half of the cost of a frac spread of this size typically goes for construction of the frac pumps 105 and trailers—about 30,000,000.00 U.S. dollars at the time of filing of this application. A typical rule of thumb for vehicles and personnel is one vehicle for each 1,000 HHP and two persons for each 1,000 HHP. Thus, a 50,000 HHP frac spread will comprise about fifty (50) vehicles and will be crewed by about ninety (90) to one hundred (100) persons. About half of these individuals work directly with the fracturing operation. The other personnel work on jobs such as wireline, water, proppant, and coiled tubing. The actual number of persons on-site can vary depending on several factors including the particular phase or operation the job is in at a given moment, how many people the operator has on site, and what ancillary equipment is deployed around the well site.

At the time of this application, by implementing the system of FIG. 4, the following benefits may be realized: (1) reduce capital expenditures, e.g., cost savings may range from about 100,000 U.S. dollars to about 350,000 U.S. dollars per fracturing operation, normalized for a period of one month operational activities, (2) decrease the total number of assets, (3) reduce maintenance facilities, (4) reduce maintenance personnel, (5) free up personnel to work on primary on-site equipment, (6) decrease time on governmental compliance for tractors, (7) decrease the number of commercial drivers on-site, (8) reduce tractor spare parts inventory, (9) reduce tractors fuel usage from otherwise excessive idle times, (10) decrease maintenance costs of tractors, (11) decrease wasted fuel from excessive idle times on frac pumps 105, (12) provide redundancy (true back-up) options in the field, lowering Non-Productive Time ("NPT"), (13) increase environmental stewardship, (14) reduce rental cost associated with lighting, (15) decrease the number of personnel on-site for operating small engines, (16) reduce time on small engine refueling, (17) redirect personnel to primary equipment and away from small engine maintenance, (18) eliminate rental generator sets employed for data van 110 primary or backup power, (19) eliminate costs and complexity for redundant power options for sand-handling equipment, (20) reduce health, safety, environment ("HSE") risks by eliminating or reducing on-site refueling of equipment, (21) remove tasks that otherwise put personnel in high risk and moderate risk areas, (e.g., red zones, yellow zones), (22) decrease personnel required to start frac pumps 105. In this example, the number of personnel on-site will be reduced by a range of about ten (10.0) to about thirty (30.0) percent during fracturing operations.

It is believed that present application and advantages will be understood by the forgoing description. Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

I claim:

1. A method for starting at least one frac pump of a bank of frac pumps comprising:
controlling circulation of pressurized hydraulic oil to the bank of frac pumps by supplying the pressurized hydraulic oil to one or more frac pumps of the bank of frac pumps at a desired time via a common hydraulic power source in fluid communication with each of the one or more frac pumps of the bank of frac pumps.

2. The method of claim 1 wherein controlling includes closed loop flow of the pressurized hydraulic oil between the hydraulic power source and the one or more frac pumps of the bank of frac pumps via a fluid conduit assembly comprising multiple fluid lines and one or more control valves.

3. The method of claim 2 wherein controlling includes the fluid conduit assembly having one or more diverter valves.

4. The method of claim 2 wherein controlling includes the fluid conduit assembly having one or more T or Y-shape shut-off valves.

5. The method of claim 2 wherein controlling includes the fluid conduit assembly having one or more threaded Tee member shut-off valves.

6. The method of claim 1 wherein controlling includes locating the hydraulic power source at a well site independent of a layout of the bank of frac pumps.

7. The method of claim 1 wherein controlling includes supplying the pressurized hydraulic oil to at least one frac pump of the one or more frac pumps of the bank of frac pumps via a fluid conduit assembly comprising a plurality of isolation valves whereby each individual isolation valve of the plurality of isolation valves is in fluid communication with a different frac pump of the bank of frac pumps.

8. The method of claim 1 wherein controlling includes supplying the pressurized hydraulic oil to at least one frac pump of the one or more frac pumps of the bank of frac pumps via a fluid conduit assembly having a string of sectional conduit and valves, the string of sectional conduit comprising pipe, flexible hydraulic hose, and combinations thereof.

9. The method of claim 1 wherein controlling includes supplying the pressurized hydraulic oil to at least one frac pump of the one or more frac pumps of the bank of frac pumps via a daisy chain fluid conduit assembly.

10. The method of claim 9 wherein controlling includes the daisy chain fluid conduit assembly having a combination of fluid conduits, fittings, connectors, and isolation valves.

11. The method of claim 1 wherein controlling includes the hydraulic power source comprising a portable hydraulic power source fluidly connected to a most proximal frac pump of the bank of frac pumps.

12. The method of claim 1 wherein controlling includes diverting at least part of the pressurized hydraulic oil to one or more hydraulic power tools.

13. A system for starting at least one frac pump of a bank of frac pumps, including:
   a hydraulic power supply system; and
   a fluid conduit assembly;
   wherein the hydraulic power supply system is in closed loop fluid communication with the bank of frac pumps via the fluid conduit assembly; and
   wherein the fluid conduit assembly is operationally configured to control delivery of pressurized hydraulic oil from the hydraulic power supply system to the bank of frac pumps in a manner effective to start an engine of at least one frac pump of the bank of frac pumps.

14. The system of claim 13 wherein the fluid conduit assembly comprises a daisy chain fluid conduit assembly operationally configured to control a start time of each frac pump of the bank of frac pumps by controlling delivery of the pressurized hydraulic oil from the hydraulic power supply system to each frac pump of the bank of frac pumps.

15. The system of claim 14 wherein the daisy chain fluid conduit assembly includes a combination of fluid conduits, connectors and valves.

16. The system of claim 13 further comprising:
   a second bank of frac pumps; and
   a second hydraulic power supply system in closed loop fluid communication with the second bank of frac pumps via a second fluid conduit assembly that is operationally configured to control flow of pressurized hydraulic oil from the second hydraulic power supply system to each frac pump of the second bank of frac pumps.

17. A system, comprising:
   a hydraulic power supply;
   one or more fluid conduit assemblies; and
   one or more banks of frac pumps in closed loop fluid communication with the hydraulic power supply via the one or more fluid conduit assemblies;
   wherein each of the one or more banks of frac pumps comprises at least two individual frac pumps; and
   wherein the one or more fluid conduit assemblies include a number of isolation valves for controlling flow of pressurized hydraulic oil from the hydraulic power supply to the individual frac pumps of the one or more banks of frac pumps.

18. The system of claim 17 wherein the number of isolation valves is at least equal to a number of individual frac pumps of the one or more banks of frac pumps.

19. The system of claim 17 wherein each of the individual frac pumps receives the pressurized hydraulic oil via a different isolation valve.

\* \* \* \* \*